United States Patent
Yamada et al.

(10) Patent No.: US 7,568,547 B2
(45) Date of Patent: Aug. 4, 2009

(54) DRIVE CONTROL APPARATUS FOR FORKLIFT

(75) Inventors: Tadashi Yamada, Kariya (JP); Hidenori Oka, Kariya (JP); Toshikazu Kamiya, Kariya (JP); Kimihide Hasegawa, Kariya (JP); Michihiro Miura, Kariya (JP); Masayuki Takahashi, Kariya (JP); Hirokazu Kobayashi, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 533 days.

(21) Appl. No.: 11/541,075

(22) Filed: Sep. 29, 2006

(65) Prior Publication Data

US 2007/0080025 A1 Apr. 12, 2007

(30) Foreign Application Priority Data

Sep. 30, 2005 (JP) .............................. 2005-288244
Jun. 29, 2006 (JP) .............................. 2006-180156

(51) Int. Cl.
*B66F 9/75* (2006.01)
*B66F 17/00* (2006.01)
*B60K 28/08* (2006.01)

(52) U.S. Cl. ..................... 180/306; 180/54.1; 180/282; 187/224

(58) Field of Classification Search ................ 180/54.1, 180/282, 306; 187/224
See application file for complete search history.

(56) References Cited

U.S. PATENT DOCUMENTS

| | | | |
|---|---|---|---|
| 3,595,343 A * | 7/1971 | Williamson | 187/224 |
| 4,265,337 A * | 5/1981 | Dammeyer | 187/224 |
| 4,598,797 A * | 7/1986 | Schultz | 187/223 |
| 5,022,496 A * | 6/1991 | Klopfleisch et al. | 187/224 |
| 5,170,863 A * | 12/1992 | Devroy | 187/224 |
| 5,652,486 A * | 7/1997 | Mueller et al. | 318/369 |
| 5,791,440 A * | 8/1998 | Lonzinski et al. | 187/223 |
| 5,816,366 A * | 10/1998 | Briday et al. | 187/224 |

(Continued)

FOREIGN PATENT DOCUMENTS

JP 2001-031391 2/2001
JP 2001-163597 6/2001

OTHER PUBLICATIONS

European Search Report dated Sep. 22, 2008 issued by European Patent Office for application No. 06121456.5-2316/1770053.

*Primary Examiner*—Christopher P Ellis
*Assistant Examiner*—Jacob Meyer
(74) *Attorney, Agent, or Firm*—Locke Lord Bissell & Liddell LLP

(57) ABSTRACT

A drive control apparatus for a forklift. Based on the load state, it is determined whether to limit a maximum vehicle speed and an acceleration/deceleration during traveling of the forklift. Limitation contents regarding the maximum vehicle speed and the acceleration/deceleration is determined based on a determination result of whether to put the limitations. A speed of the engine is adjusted based on the determined limitation contents, thereby controlling driving of the forklift. When the determined limitation contents are changed, an acceleration/deceleration limitation value is selected from a plurality of acceleration/deceleration limitation values according to the pattern of the change of the limitation contents, and drive control related to the acceleration/deceleration is executed to limit the acceleration/deceleration of the forklift by using the selected acceleration/deceleration limitation value.

10 Claims, 8 Drawing Sheets

U.S. PATENT DOCUMENTS

| | | | |
|---|---|---|---|
| 6,050,770 A * | 4/2000 | Avitan | 414/636 |
| 6,175,796 B1 * | 1/2001 | Ishikawa | 701/50 |
| 6,350,100 B1 * | 2/2002 | Naruse et al. | 414/635 |
| 6,413,185 B1 * | 7/2002 | Baginski et al. | 475/208 |
| 6,425,728 B1 * | 7/2002 | Goto | 414/636 |
| 6,554,084 B1 * | 4/2003 | Enmeiji | 180/6.24 |
| 6,896,088 B2 * | 5/2005 | Dahl et al. | 180/305 |
| 6,921,984 B2 * | 7/2005 | Rogg | 290/10 |
| 6,945,745 B2 * | 9/2005 | Retzlaff | 414/636 |
| 7,165,652 B2 * | 1/2007 | Allerding et al. | 187/224 |
| 7,287,625 B1 * | 10/2007 | Harris | 187/282 |
| 7,475,753 B2 | 1/2009 | Oka et al. | |
| 7,524,268 B2 | 4/2009 | Oka et al. | |
| 2004/0154871 A1 * | 8/2004 | Allerding et al. | 187/287 |

* cited by examiner

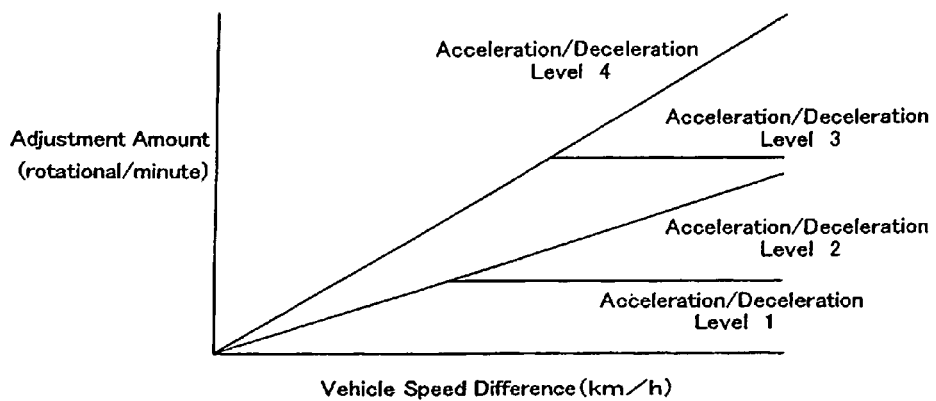

| Change Pattern | Before Change | After Change | | |
|---|---|---|---|---|
| | | Maximum Vehicle Speed | Acceleration/Deceleration | |
| P1 Unlimited→Limited | Unlimited | In Accordance with Limitation Contents | Acceleration/Deceleration Level 1 | |
| P2 Limited→Unlimited | In Accordance with Limitation Contents | Cancel Limitation | Acceleration/Deceleration Level 1 | |
| P3 Within Rearward Tilt Range →Out of Rearward Tilt Range | In Accordance with Limitation Contents | In Accordance with Limitation Contents | | |
| P4 Out of Rearward Tilt Range →Within Rearward Tilt Range | In Accordance with Limitation Contents | In Accordance with Limitation Contents | Acceleration/Deceleration Level Before Change | |

DRIVE CONTROL APPARATUS FOR FORKLIFT

BACKGROUND OF THE INVENTION

The present invention relates to a drive control apparatus for controlling driving of a forklift.

Conventionally, forklifts are widely used as industrial vehicles for handling loads (picking up and placing of loads) in plants. Due to its characteristic usage, the driving stability of this type of forklift greatly varies depending on the load state. For example, the center of gravity of the vehicle is shifted and the driving stability varies between a state of carrying no loads and a state of carrying a load. When carrying a load, the driving stability varies depending on the weight of the load, the height of the fork on which the load is mounted, the tilt angle of the fork. Thus, conventionally, techniques for limiting the driving of a forklift to improve the driving stability of the vehicle have been disclosed in Japanese Laid-Open Patent Publication Nos. 2001-31391 and 2001-163597. The technique disclosed in the publication No. 2001-31391 limits the vehicle speed in accordance with the load state of the forklift. In the publication No. 2001-163597, the minimum value of acceleration that causes rear wheels to be raised off the ground surface when the vehicle is moving rearward is computed based on the load state and is set as a permissible acceleration. The actual acceleration of the vehicle is limited not to surpass the permissible acceleration.

Driving of a forklift can be unstable during acceleration or deceleration. Thus, in order to further improve the driving stability of the forklift, limitation is preferably put on acceleration/deceleration of the vehicle in addition to limitation on the vehicle speed disclosed in publication No. 2001-31391. In this respect, the publication No. 2001-163597 limits driving of a forklift by taking into consideration the acceleration of the forklift at the start (when the forklift is reversed).

However, according to Japanese Laid-Open Patent Publication Nos. 2001-31391 and 2001-163597, in which the driving of a forklift is limited, changes in the contents of limitation are not taken into consideration. That is, no control procedure is executed for ensuring the driving stability at such changes. That is, during the driving of a forklift, the load state can be changed when the fork height is lowered or when the tilt angle is changed. Therefore, in a forklift the driving of which is limited, the contents of limitation are changed when the load state is changed during driving. For example, in a state where the vehicle speed of a forklift is limited while the fork height is high, if the fork height is lowered and the limitation on the vehicle speed is cancelled, the forklift is accelerated in accordance with the amount of depression of the accelerator pedal, and the vehicle speed is increased, accordingly. In this case, the forklift can be abruptly accelerated or decelerated in response to a change in the contents of limitation. Such a sudden change in the vehicle speed can result in an unstable driving.

SUMMARY OF THE INVENTION

Accordingly, it is an objective of the present invention to provide a drive control apparatus for a forklift that suppresses sudden acceleration and deceleration accompanying a change in the contents of limitation on the driving of the vehicle, thereby ensuring the driving stability of the vehicle.

To achieve the foregoing objectives and in accordance with one aspect of the present invention, a drive control apparatus for a forklift is provided. The forklift includes an engine, a drive wheel, a power transmission mechanism for transmitting power of the engine to the drive wheel, and a loading device that is provided at a front portion of the forklift and mounts a load. The drive control apparatus includes a load state determining section, a limitation contents determining section, and a control section. The load state determining section detects a load state of the loading device, and, based on the detected load state, determines whether to limit a maximum vehicle speed and an acceleration/deceleration during traveling of the forklift. The limitation contents determining section determines limitation contents regarding the maximum vehicle speed and the acceleration/deceleration based on a determination result of the load state determining section. When the determination result of the load state determining section is negative, the limitation contents determining section determines not to limit the maximum vehicle speed and the acceleration/deceleration. When the determination result of the load state determining section is positive, the limitation contents determining section selects, from a plurality of maximum vehicle speed limitation values and a plurality of acceleration/deceleration limitation values that are previously set according to load states, a maximum vehicle speed limitation value and an acceleration/deceleration limitation value that are appropriate for the detected load state. The control section adjusts a speed of the engine based on the limitation contents determined by the limitation contents determining section, thereby controlling driving of the forklift. When the limitation contents determined by the limitation contents determining section are changed, the control section executes drive control related to the maximum vehicle speed according to the limitation contents that are set after the change, and the control section selects an acceleration/deceleration limitation value from the acceleration/deceleration limitation values according to the pattern of the change of the limitation contents and executes drive control related to the acceleration/deceleration to limit the acceleration/deceleration of the forklift by using the selected acceleration/deceleration limitation value.

In accordance with another aspect of the present invention, a drive control method for a forklift is provided. The forklift includes an engine, a drive wheel, a power transmission mechanism for transmitting power of the engine to the drive wheel, and a loading device that is provided at a front portion of the forklift and mounts a load. The drive control method includes: detecting a load state of the loading device, and determining, based on the detected load state, whether to limit a maximum vehicle speed and an acceleration/deceleration during traveling of the forklift; determining limitation contents regarding the maximum vehicle speed and the acceleration/deceleration based on a determination result of whether to put the limitations, wherein, when the determination result is such that the limitations should not be put, it is determined not to limit the maximum vehicle speed and the acceleration/deceleration, and wherein, when the determination result is such that the limitations should be put, a maximum vehicle speed limitation value and an acceleration/deceleration limitation value that are appropriate for the detected load state are selected from a plurality of maximum vehicle speed limitation values and a plurality of acceleration/deceleration limitation values that are previously set according to load states; and adjusting a speed of the engine based on the determined limitation contents, thereby controlling driving of the forklift, wherein, when the determined limitation contents are changed, drive control related to the maximum vehicle speed is executed according to the limitation contents that are set after the change, an acceleration/deceleration limitation value is selected from the acceleration/deceleration limitation values according to the pattern of the change of the limitation contents, and drive control related to the acceleration/deceleration is executed to limit the acceleration/deceleration of the forklift by using the selected acceleration/deceleration limitation value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is a relational diagram showing the relationship among an adjustment amount of the engine speed, a vehicle speed difference, and an acceleration/deceleration level;

FIG. 9 is a chart showing the contents of drive control;

DETAILED DESCRIPTION OF THE PREFERRED EMBODIMENTS

First Embodiment

A drive control apparatus CD for use in a forklift 10 according to a first embodiment of the present invention will now be described with reference to FIGS. 1 to 9.

Figure 1:
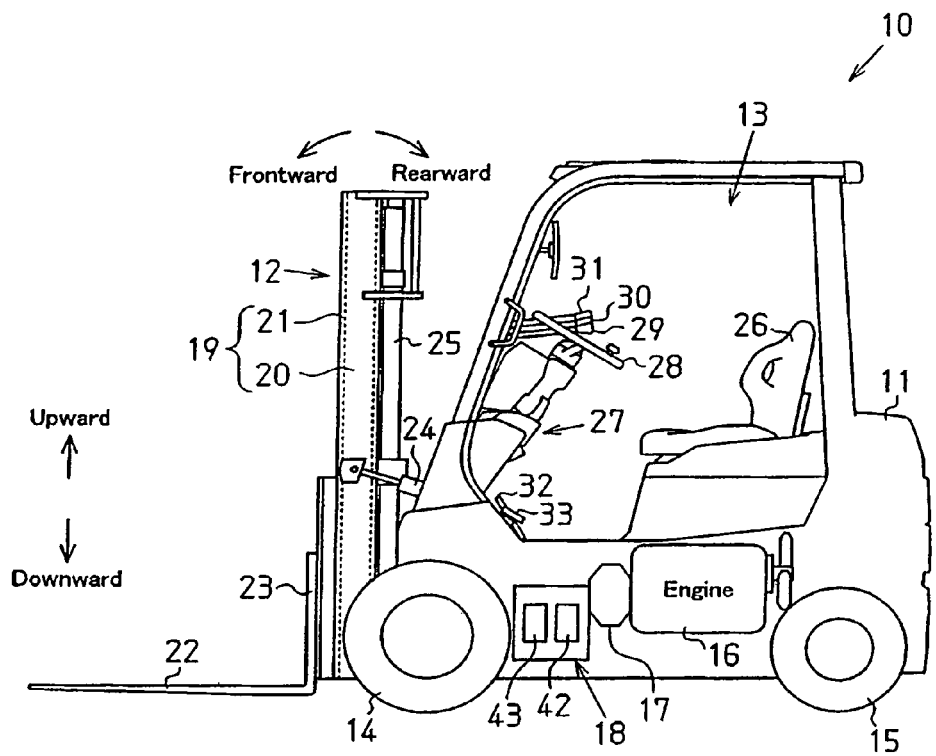
FIG. 1 is a side view illustrating a forklift.

FIG. 1 is a side view of the forklift 10. As shown in FIG. 1, the forklift 10 includes a loading device 12 at a front portion of a vehicle body 11. A cab 13 is formed in a center portion of the vehicle body 11. Drive wheels (front wheels) 14 are located in front and lower portions of the vehicle body 11, and steered wheels 15 are provided in rear and lower portions of the vehicle body 11. The vehicle body 11 also mounts a transmission 18 having a torque converter 17. The transmission 18 forms a power transmission mechanism. An engine 16 is coupled to the drive wheels 14 by way of the transmission 18 having the torque converter 17. The transmission 18 is located between the drive wheels 14 and the engine 16. The forklift 10 of this embodiment is an engine type (engine vehicle), in which the drive wheels 14 are driven by the engine 16. That is, the forklift 10 moves by using the power of the engine 16.

The loading device 12 will now be described. A multistage (two-stage in this embodiment) mast assembly 19 is provided at a front portion of the vehicle body 11. The mast assembly 19 includes a pair of left and right outer masts 20 and a pair of left and right inner masts 21. A pair of left and right forks 22 are attached to the mast assembly 19 by means of a lift bracket 23. A hydraulic tilt cylinder 24 is coupled to each outer mast 20 to tilt the mast assembly 19 (the forks 22) frontward and rearward of the vehicle body 11. A hydraulic lift cylinder 25 is coupled to each inner mast 21. The lift cylinders 25 lift and lower the forks 22 with respect to the vehicle body.

A driver's seat 26, on which a driver is seated, is provided in the cab 13. Also, an instrument panel 27 is provided in a front portion of the cab 13. On the instrument panel 27, a steering wheel 28, a lift lever 29, a tilt lever 30, and an advance/reverse lever (direction lever) 31 are provided. The steering wheel 28 is used for changing the steered angle of the steered wheels 15. The lift lever 29 is operated for lifting or lowering the forks 22, and the tilt lever 30 is operated for tilting the mast assembly 19. When the lift lever 29 is operated, the lift cylinders 25 are actuated in accordance with the direction of the operation (lifting direction or lowering direction), so that the inner masts 21 are slid along the outer masts 20. Accordingly, the forks 22 are lifted or lowered. When the tilt lever 30 is operated, the tilt cylinders 24 are actuated (extended or retracted) in accordance with the direction of the operation (forward tilting direction or rearward tilting direction), so that the mast assembly 19 is tilted with the forks 22. The advance/reverse lever 31 is operated for instructing the moving direction of the vehicle (in this embodiment, advancing direction or reversing direction).

Figure 3:
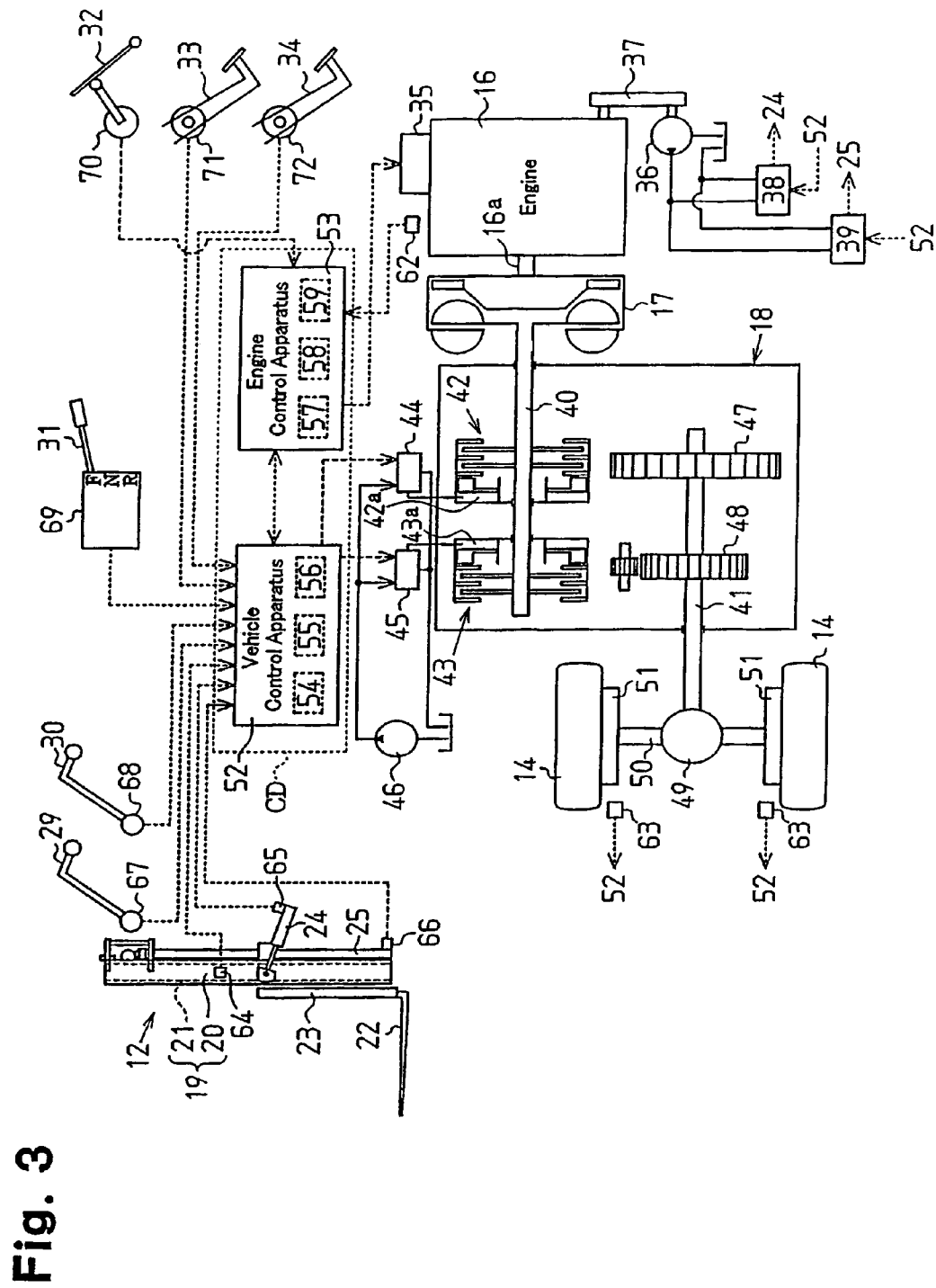
FIG. 3 is a diagrammatic view showing the forklift.

On the floor of the cab 13, acceleration operation device or an acceleration instructing device, which is an accelerator pedal 32, an inching pedal (inching operation device) 33, and a brake pedal 34 (brake operation device), are provided. FIG. 1 shows the accelerator pedal 32 and the inching pedal 33. FIG. 3 shows the brake pedal 34. The accelerator pedal 32 is operated for instructing acceleration (driving) of the vehicle. The inching pedal 33 is operated for partially engaging the clutches of the transmission 18 (an advancing clutch 42 and a reversing clutch 43) when manually operating the vehicle to slowly move during loading. The engagement state of the clutches (the advancing clutch 42 and the reversing clutch 43) is continuously changed between engagement and disengagement by means of the inching pedal 33. The brake pedal 34 is operated for applying braking force to the vehicle. When operated, the brake pedal 34 is operated independently from the inching pedal 33. On the other hand, when operated over halfway, the inching pedal 33 starts being interlocked with the brake pedal 34. That is, the inching pedal 33 is operated independently from the brake pedal 34 (non-interlocking) in an inching region, and interlocked with the brake pedal 34 outside of the inching region (braking region). The inching region refers to a region in which the inching pedal 33 is depressed and the clutch (the advancing clutch 42 or the reversing clutch 43) is partially engaged. The braking region is a region in which braking force is applied to the vehicle.

FIG. 3 is a diagrammatic view showing the forklift 10 of the present embodiment.

An output shaft 16a of the engine 16 is coupled to the transmission 18 with the torque converter 17. The engine 16 is provided with a throttle actuator 35. The throttle actuator 35 is actuated to adjust the opening degree of a throttle valve. Accordingly, the speed of the engine 16, that is, the speed of the output shaft 16a, is adjusted. The engine 16 is also connected to a hydraulic pump (loading pump) 36, with a speed increasing gear 37. The hydraulic pump 36 is driven by the engine 16. In the forklift 10 of the present embodiment, the power of the engine 16 is used for moving the vehicle and for actuating the loading device 12 (the tilt cylinders 24 and the lift cylinders 25). The discharge side of the hydraulic pump 36 is connected to the tilt cylinders 24 for tilting the mast assembly 19 (the forks 22) and the lift cylinders 25 for lifting and lowering the forks 22. The tilt cylinders 24 are connected to the hydraulic pump 36 with pipes and a fork tilting electromagnetic control valve 38, while the lift cylinders 25 are connected to the hydraulic pump with pipes and a fork lifting/lowering electromagnetic control valve 39.

The transmission 18 has an input shaft (main shaft) 40 and an output shaft (counter shaft) 41. The input shaft 40 is connected to the advancing clutch 42 and the reversing clutch 43. The advancing clutch 42 and the reversing clutch 43 are hydraulic clutches (in this embodiment, wet multi-disc clutches). The advancing clutch 42 and the reversing clutch 43 have a pressure receiving chamber 42a, 43a, respectively. The engagement force of each clutch 42, 43 is adjusted by the hydraulic pressure in the corresponding pressure receiving chamber 42a, 43a (hereinafter, referred to as clutch pressure). When the clutch pressure is increased, the engagement force is reduced.

The advancing clutch 42 is connected to an advancing electromagnetic valve 44, and the reversing clutch 43 is connected to a reversing electromagnetic valve 45. The electromagnetic valves 44, 45 are connected to a hydraulic pump 46 with pipes. The hydraulic pump 46 is driven by the rotational force transmitted to the transmission 18 when the engine 16 is running (rotational force of the input shaft 40 of the transmission 18). The pressure receiving chamber 42a of the advancing clutch 42 is supplied with hydraulic oil through the advancing electromagnetic valve 44 by the actuation of the hydraulic pump 46. Likewise, the pressure receiving chamber 43a of the reversing clutch 43 is supplied with hydraulic oil through the reversing electromagnetic valve 45 by the actuation of the hydraulic pump 46. In this embodiment, the advancing electromagnetic valve 44 and the reversing electromagnetic valve 45 are fully open when the current to the solenoid is zero, and are fully closed when a current is supplied to the solenoid. When currents to the solenoids of the electromagnetic valves 44, 45 become zero, hydraulic oil is supplied to the pressure receiving chambers 42a, 43a, and the advancing clutch 42 and the reversing clutch 43 are disengaged. When currents are supplied to the solenoids of the electromagnetic valves 44, 45, no hydraulic oil is supplied to the pressure receiving chambers 42a, 43a, and the advancing clutch 42 and the reversing clutch 43 are engaged.

An advance gear train 47 and a reverse gear train 48 are attached to the output shaft 41 of the transmission 18. The gear trains 47, 48 transmit rotation of the input shaft 40 to the output shaft 41. The output shaft 41 of the transmission 18 is coupled to an axle 50 with a differential 49. The drive wheels 14 are proved at ends of the axle 50. The power of the engine 16 is transmitted to the axle 50 through the output shaft 41 of the transmission 18, and the drive wheels 14 are rotated in a direction corresponding to the rotating direction of the output shaft 41. A hydraulic drum brake 51 is provided at each drive wheel 14.

Although the torque converter 17, the transmission 18, the advancing electromagnetic valve 44, the reversing electromagnetic valve 45, the hydraulic pump 46 are each depicted independently in FIG. 3, these components are accommodated in a single housing.

The vehicle body 11 mounts a vehicle control apparatus 52 and an engine control apparatus 53. In this embodiment, the vehicle control apparatus 52 and the engine control apparatus 53 form the drive control apparatus CD (depicted by a broken line in FIG. 3) for controlling the driving of the forklift 10. The vehicle control apparatus 52 and the engine control apparatus 53 are connected to each other such that electrical signals can be sent between the apparatuses 52, 53. The vehicle control apparatus 52 and the engine control apparatus 53 may be connected with wires or wirelessly connected. The vehicle control apparatus 52 has a central processing unit (CPU) 54 for controlling the vehicle, a random access memory 55 for controlling the vehicle, and an input-output interface 56. The memory 55 stores control programs for controlling driving and loading of the forklift 10. The memory 55 also stores map data for controlling driving and loading of the forklift 10 (shown in FIGS. 4, 5, and 6). The engine control apparatus 53 has a central processing unit (CPU) 57 for controlling the engine 16, a random access memory 58 for controlling the engine 16, and an input-output interface 59. The memory 58 stores control programs for controlling the engine 16. The memory 58 also stores map data for controlling the engine 16 (shown in FIG. 8). The vehicle control apparatus 52 inputs detection signals from various types of sensors and various types of signals from the engine control apparatus 53, and controls the driving and loading of the forklift 10. The engine control apparatus 53 inputs detection signals from various types of sensors and various types of signals from the vehicle control apparatus 52, and controls the engine 16.

Figure 2:
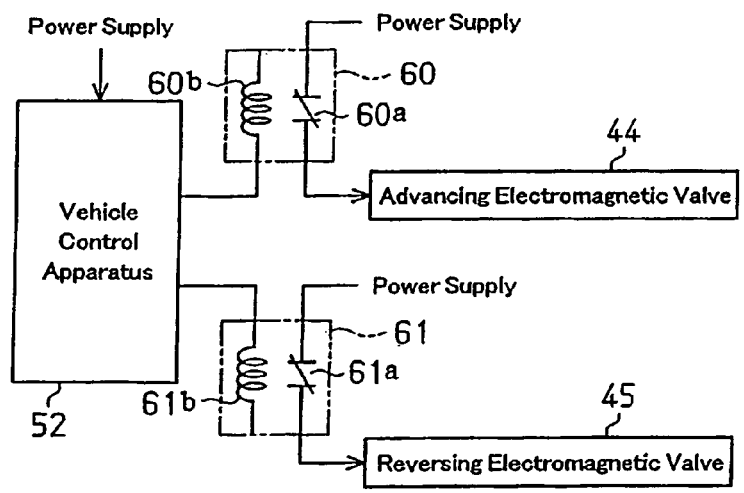
FIG. 2 is a diagram showing a relay circuit for advancing and relay circuit for reversing, which are located between a vehicle control apparatus and an electromagnetic valve for advancing and between the vehicle control apparatus and an electromagnetic valve for reversing, respectively.

The vehicle control apparatus 52 is connected to the advancing electromagnetic valve 44 through an advancing relay circuit 60 as shown in FIG. 2, and to the reversing electromagnetic valve 45 through a reversing relay circuit 61. The advancing relay circuit 60 is formed by an advancing normally-closed contact (contact b) 60a and an advancing relay coil (electromagnet) 60b. The advancing electromagnetic valve 44 is energized by demagnetizing the advancing relay coil 60b and closing the advancing normally-closed contact 60a. The reversing relay circuit 61 is formed by a reversing normally-closed contact (contact b) 61a and a reversing relay coil (electromagnet) 61b. The reversing electromagnetic valve 45 is energized by demagnetizing the reversing relay coil 61b and closing the reversing normally-closed contact 61a.

Hereafter, various sensors mounted on the forklift 10 and connection of the sensors (to what the sensors are connected) will be described.

An engine speed sensor 62 for detecting the speed of the engine 16 is provided at the engine 16. The engine speed sensor 62 is connected to the engine control apparatus 53 and outputs a detection signal (engine speed signal) corresponding to the engine speed. Detection signals of the engine speed sensors 62 are outputted to the vehicle control apparatus 52 via the engine control apparatus 53. Vehicle speed sensors 63 for detecting the vehicle speed of the forklift 10 are provided at positions of the vehicle body 11 that correspond to the drive wheels 14. The vehicle speed sensors 63 are connected to the vehicle control apparatus 52 and each output a detection signal (vehicle speed signal) corresponding to the vehicle speed. Detection signals of the vehicle speed sensors 63 are outputted to the engine control apparatus 53 via the vehicle control apparatus 52.

A height sensor 64 for detecting the height of the forks 22 is provided in the mast assembly 19. The height sensor 64 is connected to the vehicle control apparatus 52. When the forks 22 reach a predetermined height H (for example, 2200 mm), the height sensor 64 outputs a detection signal (height signal). The height sensor 64 is formed, for example, by a limit switch. In this embodiment, the single height sensor 64 is provided in the mast assembly 19. A range equal to or higher than the height H detected by the height sensor 64 is defined as a high height range, and a range lower than the height H is defined as a low height range.

A tilt angle sensor 65 for detecting the tilt angle is attached to one of the tilt cylinders 24. The tilt angle sensor 65 is connected to the vehicle control apparatus 52 and detects an inclination angle of the forks 22 with respect to the angle of the forks 22 at a horizontal position (horizontal angle). The tilt angle sensor 65 outputs a detection signal (tilt angle signal) that corresponds to the inclination angle. The tilt angle sensor 65 is formed, for example, by a potentiometer. A load sensor 66 for detecting the weight of a load on the forks 22 is attached to one of the lift cylinders 25. The load sensor 66 is connected to the vehicle control apparatus 52 and detects the hydraulic pressure in the lift cylinder 25. The load sensor 66 outputs a detection signal (load signal) that corresponds to the weight of the load on the forks 22. The load sensor 66 is formed, for example, by a pressure sensor.

A lift lever sensor 67 for detecting the moved amount of the lift lever 29 is attached to the lift lever 29. A tilt lever sensor 68 for detecting the moved amount of the tilt lever 30 is attached to the tilt lever 30. The lift lever sensor 67 and the tilt lever sensor 68 are connected to the vehicle control apparatus 52, and output detection signals (lift manipulation signal and tilt manipulation signal) that correspond to the moved amounts of the lift lever 29 and the tilt lever 30. A shift switch 69 for detecting the position of the advance/reverse lever 31 (advance position [F], neutral position [N], reverse position [R]) is attached to the advance/reverse lever 31. The shift switch 69 is connected to the vehicle control apparatus 52 and outputs a detection signal (advance/reverse signal) that corresponds to the position of the advance/reverse lever 31. In this embodiment, when the advance/reverse lever 31 is at the advance position [F] or the reverse position [R], the shift switch 69 outputs a signal corresponding to the position. When the advance/reverse lever 31 is at the neutral position [N], the shift switch 69 outputs no detection signal. That is, the CPU 54 of the vehicle control apparatus 52 receives a detection signal from the shift switch 69 to determine that the advance/reverse lever 31 is at the advance position [F] or the reverse position [R]. When receiving no detection signal, the CPU 54 determines that the advance/reverse lever 31 is at the neutral position [N].

An accelerator pedal position sensor 70 is provided at the accelerator pedal 32 to detect the depression amount of the accelerator pedal 32. The accelerator pedal position sensor 70 is connected to the engine control apparatus 53 and outputs a detection signal (pedal depression amount signal) corresponding to the depression amount. When depressed (operated state), the accelerator pedal 32 instructs acceleration of the forklift 10 (ON operation). When released (non-operated state), the accelerator pedal 32 does not instruct acceleration the forklift 10 (OFF operation).

An inching switch 71 is provided at the inching pedal 33 to detect the depression state of the inching pedal 33. The inching switch 71 is connected to the vehicle control apparatus 52 and outputs a detection signal (inching signal) that corresponds to the depression state. More specifically, when the clutch (the advancing clutch 42 or the reversing clutch 43) is engaged, the inching switch 71 outputs a detection signal. The clutch (the advancing clutch 42 or the reversing clutch 43) is either in an engaged state for transmitting power, a disengaged state for disconnecting power transmission, or a partially engaged state when being shifted between the engaged state and the disengaged state. Therefore, in this embodiment, the inching switch 71 is installed in a such a manner as to output a detection signal when the clutch is in the engaged state. The inching switch 71 does not output detection signals when the clutch is in the disengaged state (disconnection state) and the partially engaged state. When depressed, the inching pedal 33 disengages the clutch (ON operation). When released, the inching pedal 33 is engages the clutch (OFF operation). When the operation of the inching pedal 33 is shifted form the ON operation to the OFF operation, the forklift 10 is shifted from a driving force disconnection state to a driving force connection state. When the operation of the inching pedal 33 is shifted form the OFF operation to the ON operation, the forklift 10 is shifted from the driving force connection state to the driving force disconnection state A brake switch 72 is provided at the brake pedal 34 to detect the depression state of the brake pedal 34. The brake switch 72 is connected to the vehicle control apparatus 52 and outputs a detection signal (brake signal) that corresponds to the depression state. More specifically, the brake switch 72 outputs a detection signal when the brake pedal 34 is depressed. When the driver depresses solely the brake pedal 34, the brake switch 72 or when the driver depresses the brake pedal 34 together with the inching pedal 33, the brake switch 72 outputs a detection signal. When depressed, the brake pedal 34 causes the drum brakes 51 to apply braking force to the drive wheels 14 (ON operation). When released, the brake pedal 34 stops causing the drum brakes 51 to apply braking force to the drive wheels 14 (OFF operation).

In the forklift 10 of the present embodiment, when the engine 16 is started with the advance/reverse lever 31 at the neutral position [N], the advancing relay coil 60b and the reversing relay coil 61b are excited to open the advancing normally-closed contact 60a and the reversing normally-closed contact 61a. Thus, the advancing electromagnetic valve 44 and the reversing electromagnetic valve 45 are not energized. As a result, the advancing clutch 42 and the reversing clutch 43 are disengaged.

After the engine 16 is started, when the driver shifts the advance/reverse lever 31 from the neutral position [N] to the advance position [F], the vehicle control apparatus 52 receives a detection signal from the shift switch 69 (a signal indicating that the lever 31 has been shifted to the advance position [F]), and de-excites the advancing relay coil 60b, thereby energizing the advancing electromagnetic valve 44. As a result, the advancing clutch 42 is engaged. After the engine 16 is started, when the driver shifts the advance/reverse lever 31 from the neutral position [N] to the reverse position [R], the vehicle control apparatus 52 receives a detection signal from the shift switch 69 (a signal indicating that the lever 31 has been shifted to the reverse position [R]), and de-excites the reversing relay coil 61b, thereby energizing the reversing electromagnetic valve 45. As a result, the reversing clutch 43 is engaged. When the driver depresses the accelerator pedal 32, the engine control apparatus 53 receives a detection signal from the accelerator pedal position sensor 70 (a signal in accordance with the depression amount of the accelerator pedal 32) and controls the throttle actuator 35.

The speed of the engine 16 is adjusted accordingly, and the forklift 10 moves in a direction that corresponds to the position of the advance/reverse lever 31 (advancing direction or reversing direction).

When the driver manipulates the lift lever 29, the vehicle control apparatus 52 receives a detection signal from the lift lever sensor 67 (a signal in accordance with the manipulation amount of the lift lever 29) and controls the fork lifting/lowering electromagnetic control valve 39. When the driver manipulates the tilt lever 30 during loading, the vehicle control apparatus 52 receives a detection signal from the tilt lever sensor 68 (a signal in accordance with the manipulation amount of the tilt lever 30) and controls the fork tilting electromagnetic control valve 38. Then, the driver depresses the inching pedal 33 during loading, thereby causing the clutch (the advancing clutch 42 and the reversing clutch 43) to be partially engaged or disengaged, and depresses the accelerator pedal 32. These manipulations (actions) causes rotation of the engine 16 to actuate the hydraulic pump 36. When the lift lever 29 is manipulated, hydraulic oil is supplied to the lift cylinders 25 by the fork lifting/lowering electromagnetic valve 39. When the tilt lever 30 is manipulated, hydraulic oil is supplied to the tilt cylinders 24 by the fork tilting electromagnetic control valve 38. As a result, the lift cylinders 25 are extended or retracted in accordance with the manipulation direction of the lift lever 29, and the forks 22 are lifted or lowered, accordingly. Also, the tilt cylinders 24 are extended or retracted in accordance with the manipulation direction of the tilt lever 30, and the mast assembly 19 (the forks 22) are inclined forward or rearward, accordingly. During a loading operation of the forklift 10, the inching pedal 33 is depressed, the clutch (the advancing clutch 42 and the reversing clutch 43) is partially engaged or disengaged (disconnected). When the forklift 10 is driven after loading operation, the inching pedal 33 is released so that the clutch (advancing clutch 42 and the reversing clutch 43) is engaged. Then, the accelerator pedal 32 is depressed for instructing acceleration.

Hereafter, various control procedures executed by the vehicle control apparatus 52 and the engine control apparatus 53 will be described. The vehicle control apparatus 52 and the engine control apparatus 53 execute the control procedures shown below in accordance with control programs. In the present embodiment, the CPU 54 of the vehicle control apparatus 52 functions as load state determining section and limitation contents determining section.

Map data stored in the memory 55 of the vehicle control apparatus 52 will be described with reference FIG. 4 to FIG. 6.

Figure 4:
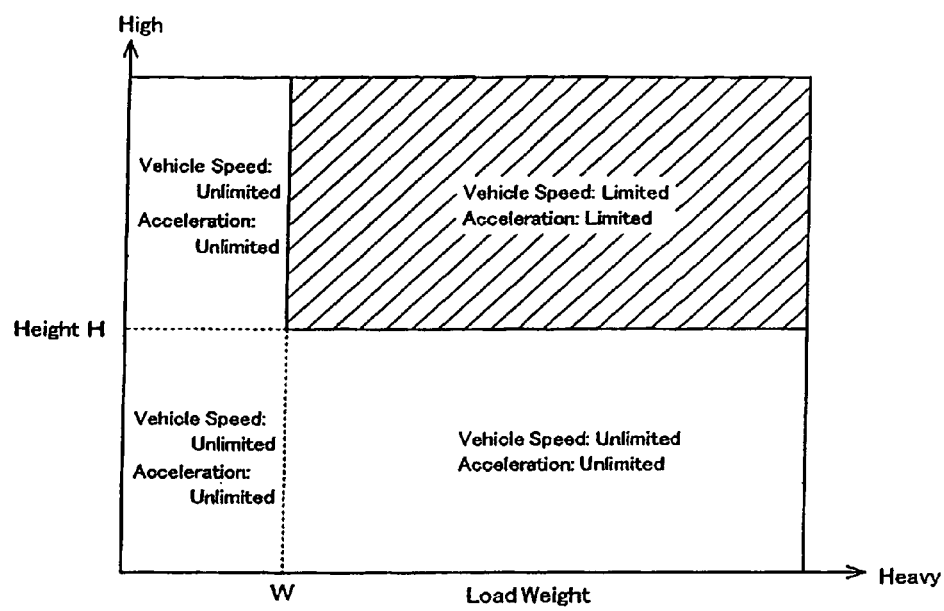
FIG. 4 is a relational diagram showing a limitation region and a no-limitation region of a vehicle, defined according to a load state.

The map data of FIG. 4 is referred to for determining whether, based on the load state, the driving of the forklift 10 should be limited, that is, whether the maximum vehicle speed and the acceleration/deceleration should be limited (hereafter, referred to as necessity determining data). In this embodiment, the necessity determining data defines a limitation region, in which the maximum speed and acceleration/deceleration are limited based on two parameters, or the fork height and the load weight, and a non-limitation region, in which no limitation is put. Specifically, a region corresponding to fork heights equal to or more than a fork height H and load weights equal to or more than a load weight W is set as the limitation region, and a region corresponding to either fork heights less than the fork height H or load weights less than the load weight W is set as the non-limitation region. In the necessity determining data shown in FIG. 4, a region in which the fork height is high and the load weight is heavy, or a region in which the load state is harsh, is set as the limitation region. In FIG. 4, the limitation region is shown by a diagonally shaded area.

Figure 5:
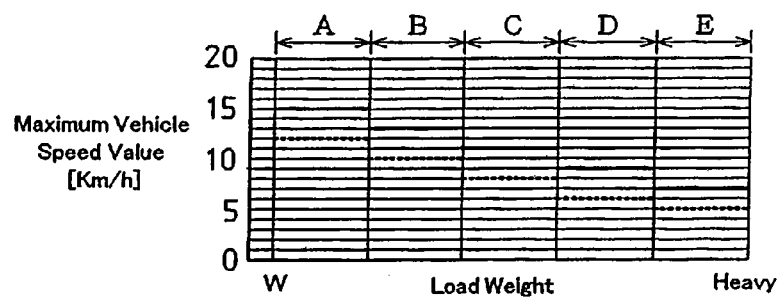
FIG. 5 is a relational diagram showing the relationship between the load state and a maximum vehicle speed value.

Map data of FIG. 5 is referred for computing (determining) a maximum vehicle speed value (maximum vehicle speed limitation value) in the case where the maximum vehicle speed is limited, that is, when the load state is determined to be in the limitation region based on the necessity determining data of FIG. 4. The map data of FIG. 5 is hereafter referred to as vehicle speed computing data. In this embodiment, the vehicle speed computing data defines the maximum vehicle speed value [km/h] based on two parameters, or the load weight and the tilt angle. Specifically, the load region equal to or more than the load weight W is divided into several regions (in this embodiment, five regions A, B, C, D, E as shown in FIG. 5), and the maximum vehicle speed value is defined based on whether the tilt angle is in the rearward tilt range in each of the five regions. That is, the maximum vehicle speed values are set as limitation values each corresponding to one of multiple load states (load weights and tilt angles). The case in which the tilt angle is in the rearward tilt range refers to a case in which the mast assembly 19 (the forks 22) is inclined rearward with respect to the vehicle body 11 (rearward inclined state). The case other than the rearward tilt range refers to a case where the mast assembly 19 is vertical (the forks 22 are horizontal) and a case where the mast assembly 19 is inclined forward with respect to the vehicle body 11 (forward inclined state).

According to the vehicle speed computing data of FIG. 5, the maximum vehicle speed value in the case where the tilt angle is in the rearward tilt range is shown by solid lines. The maximum vehicle speed value in the case where the tilt angle is out of the rearward tilt range is shown by broken lines. For example, in the region A, the maximum vehicle speed value in the case where the tilt angle is in the rearward tilting range is set to 15(km/h), and the maximum vehicle speed value in the case where the tilt angle is out of the rearward tilting range is set to 12 (km/h). That is, when the tilt angle is out of the rearward tilt range, the center of gravity of the load is located in a front portion of the vehicle. On the other hand, when tilt angle is in the rearward tilt range, the center of gravity of the load is located in a rear portion of the vehicle. Therefore, when the tilt angle is out of the rearward tilt range, the load state is harsher than the case where the tilt angle is in the rearward tilt range. Thus, even if the weight of the load is the same, the maximum vehicle speed value varies in accordance with the tilt angle. When the tilt angle is out of the rearward tilt range, the maximum vehicle speed is set lower than the case where the tilt angle is in the rearward tilt range.

Figure 6:
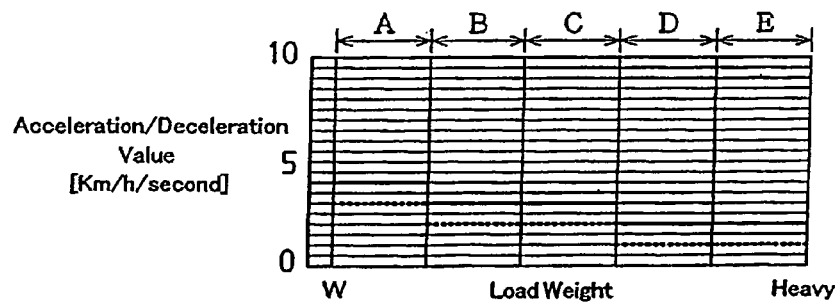
FIG. 6 is a relational diagram showing the relationship between the load state and an acceleration/deceleration value.

Map data of FIG. 6 is referred for computing an acceleration/deceleration value (acceleration/deceleration limitation value) in the case where the acceleration/deceleration is limited, that is, when the load state is determined to be in the limitation region based on the necessity determining data of FIG. 4. The map data of FIG. 5 is hereafter referred to as acceleration/deceleration computing data. In this embodiment, the acceleration/deceleration computing data defines the acceleration/deceleration value [km/h/second] based on two parameters, or the load weight and the tilt angle. Specifically, the load region equal to or more than the load weight W is divided into several regions (in this embodiment, the five regions A, B, C, D, E as shown in FIG. 5), and the acceleration/deceleration value is defined based on whether the tilt angle is in the rearward tilt range in each of the five regions. That is, the acceleration/deceleration values are set as limitation values each corresponding to one of multiple load states (load weights and tilt angles). [km/h/second] is a value obtained by converting the acceleration/deceleration value per second into the acceleration/deceleration value per hour. In the acceleration/deceleration data of FIG. 6, the load region equal to or more than the weight W is divided at the same values of the weight as the vehicle speed computation data of FIG. 5.

According to the acceleration/deceleration computing data of FIG. 6, the acceleration/deceleration value in the case where the tilt angle is in the rearward tilt range is shown by solid lines. The acceleration/deceleration value in the case where the tilt angle is out of the rearward tilt range is shown by broken lines. For example, in the region A, the acceleration/deceleration value in the case where the tilt angle is in the rearward tilting range is set to 4 km/h/second, and the acceleration/deceleration value in the case where the tilt angle is out of the rearward tilting range is set to 3 km/h/second. That is, even if the weight of the load is the same, the acceleration/deceleration value varies in accordance with the tilt angle. When the tilt angle is out of the rearward tilt range, the acceleration/deceleration value is set lower than the case where the tilt angle is in the rearward tilt range. Hereinafter, in the acceleration/deceleration data shown in FIG. 6, acceleration/deceleration values of 1 km/h/second, 2 km/h/second, 3 km/h/second, and 4 km/h/second are referred to, when necessary, as acceleration/deceleration level 1, acceleration/deceleration level 2, acceleration/deceleration level 3, and acceleration/deceleration level 4.

Figure 7:
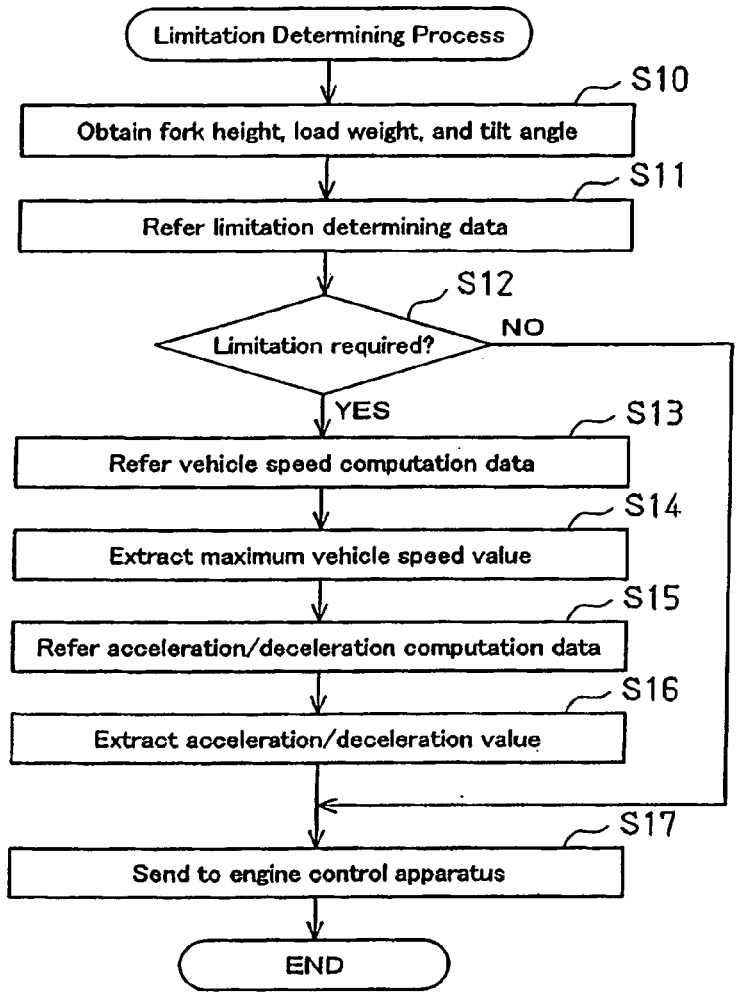
FIG. 7 is a flowchart showing a limitation determining process.

FIG. 7 shows a limitation determining process executed by the CPU 54 of the vehicle control apparatus 52. The limitation determining process is a process for determining the load state based on map data shown in FIGS. 4 to 6 and extracting (determining) the maximum vehicle speed value and the acceleration/deceleration value.

In the limitation determining process, the CPU 54 obtains information related to the fork height, the load weight, and the tilt angle for determining the load state (step S10). At step S10, the CPU 54 obtains the fork height, the tilt angle, and the load weight from detection signals from the height sensor 64, the tilt angle sensor 65, and the load sensor 66. Subsequently, the CPU 54 refers to the necessity determining data shown in FIG. 4 (step S11), and determines whether the maximum vehicle speed and the acceleration/deceleration should be limited during driving based on the information regarding the fork height and the load weight obtained at step S10 and the data of FIG. 4 (step S12). At step S12, the CPU 54 determines whether the load state is in the limitation region, which corresponds to high fork heights and heavy load weights.

If the decision outcome of step S12 is positive (limitation required), the CPU 54 refers to the vehicle speed computation data shown in FIG. 5 (step S13), and extracts the maximum vehicle speed value appropriate for the load state based on the referred data and the information related to the weight load and the tilt angle obtained at step S10 (step S14). At step S14, if, for example, the load weight is in the region B, the CPU 54 extracts 13 km/h as the maximum vehicle speed value in the case where the tilt angle is in the rearward tilt range, and extracts 10 km/h in the case where the tilt angle is out of the rearward tilt range. After extracting the maximum vehicle speed value at step S14, the CPU 54 stores the extracted maximum vehicle speed value in the memory 55.

Subsequently, the CPU 54 refers to the acceleration/deceleration data shown in FIG. 5 (step S15), and extracts the acceleration/deceleration value appropriate for the load state based on the referred data and the information related to the weight load and the tilt angle obtained at step S10 (step S16). At step S16, if, for example, the load weight is in the region B, the CPU 54 extracts 3 km/h/second as the acceleration/deceleration value in the case where the tilt angle is in the rearward tilt range, and extracts 2 km/h/second in the case where the tilt angle is out of the rearward tilt range. After extracting the acceleration/deceleration value at step S16, the CPU 54 stores the extracted acceleration/deceleration value in the memory 55.

Subsequently, the CPU 54 sends a limitation signal to the engine control apparatus to instruct the maximum vehicle speed value extracted at step S14 and the acceleration/deceleration value extracted at step S16. Thereafter, the CPU 54 ends the limitation determining process. If the decision outcome of step S12 is negative (limitation not required), the CPU 54 proceeds to step S17, and sends a limitation signal to the engine control apparatus to instruct not to limit the maximum vehicle speed and the acceleration/deceleration. If the decision outcome of step S12 is negative, the CPU 54 stores in the memory 55 the fact that the maximum vehicle speed and the acceleration/deceleration will not be limited. Thereafter, the CPU 54 ends the limitation determining process. When the decision outcome at step S12 is negative, the load state is in the non-limitation region (low fork height or light load weight).

In the present embodiment, the contents of limitation on the maximum vehicle speed and the acceleration/deceleration during the driving of the forklift 10 are determined through steps S12 to S16. Specifically, when the decision outcome at step S12 is positive, the maximum vehicle speed value and the acceleration/deceleration value are determined as the limitation contents. When the decision outcome at step S12 is negative, it is determined that no limitation will put.

Next, the contents of control by the engine control apparatus 53 will now be described.

When it is determined that the driving of the vehicle should not be limited in the limitation determining process, the CPU 57 of the engine control apparatus 53 controls the throttle actuator 35 based on a detection signal of the accelerator pedal position sensor 70 provided at the accelerator pedal 32, thereby adjusting the engine speed. That is, the CPU 57 does not limit the maximum vehicle speed and the acceleration/deceleration, but adjusts the engine speed in accordance with the depression amount of the accelerator pedal 32 (operation amount), thereby driving the forklift 10. When putting no limitation on the driving of the vehicle, the engine speed is increased in accordance with the depression amount of the accelerator pedal, and the vehicle speed is increased in accordance with the depression amount of the accelerator pedal 32.

On the other hand, when it is determined that the driving of the vehicle should be limited in the limitation determining process, the CPU 57 adjusts the engine speed based on the map data shown in FIG. 8 (hereafter, also referred to as engine speed adjusting data). The engine speed adjusting data is used for computing an adjusting amount of the engine speed when limiting the driving of the vehicle, and is stored in the memory 58 of the engine control apparatus 53.

The engine speed adjustment data of the present embodiment is a graph representing the relationship between the difference between the maximum vehicle speed value and the actual vehicle speed (hereafter, referred to as vehicle speed difference) and the adjustment amount of the engine speed. The relationship is determined according to the four acceleration/deceleration levels [1] to [4]. The vehicle speed difference is a difference between the maximum vehicle speed value extracted at step S14 of the limitation determining process and the vehicle speed detected by the vehicle speed sensor 63. In the engine speed adjustment data, the relationship between the vehicle speed difference and the engine speed is defined such that the adjustment amount of the engine speed increases as the vehicle speed difference increases. The relationship between the vehicle speed difference and the adjustment amount of the engine speed is defined such that, as the acceleration/deceleration level approaches [1] (as the load state becomes harsher), the adjustment amount of the engine speed is reduced in relation to the vehicle speed difference. That is, since as the acceleration/deceleration level approaches the level [1], the adjustment amount of the engine speed decreases, the forklift 10 is gradually accelerated and gradually decelerated.

The CPU 57 obtains the current vehicle speed from a detection signal of the vehicle speed sensor 63 at every predetermined control cycle, and subtracts the obtained vehicle speed from the maximum vehicle speed value, thereby computing the vehicle speed difference. Subsequently, the CPU 57 obtains the acceleration/deceleration value (the value of the acceleration/deceleration level) stored in the memory 58. Based on the vehicle speed difference and the acceleration/deceleration level, the CPU 57 computes the adjustment amount of the engine speed from the engine speed adjustment data shown in FIG. 8. After computing the adjustment amount of the engine speed, the CPU 57 controls the throttle actuator 35 based on the adjustment amount, thereby adjusting the throttle opening degree. The speed of the engine 16 is adjusted, accordingly. That is, the CPU 57 performs feedback control such that the actual vehicle speed does not exceed the maximum vehicle speed value. That is, when limiting the maximum vehicle speed and the acceleration/deceleration, the CPU 57 adjusts the engine speed such that the vehicle speed is equal to or less than the maximum vehicle speed value regardless of the depression amount of the accelerator pedal 32 (operation amount), and drives the forklift 10. When limiting the driving of the vehicle, increase of the engine speed is suppressed such that the vehicle speed does not exceed the maximum vehicle speed value. Even if the accelerator pedal 32 is fully depressed, the vehicle speed does not exceed the maximum vehicle speed value. Also, in the case where the driving of the vehicle is limited, the acceleration/deceleration is limited. That is, the degree of acceleration and the degree of deceleration vary according to the acceleration/deceleration level.

In this embodiment, when the load state is changed while the forklift 10 is moving, and the contents of limitation on the vehicle driving (the maximum vehicle speed value and the acceleration/deceleration value) are changed depending on the change of the load state, a drive control for suppressing a sudden change in the vehicle speed (acceleration and deceleration) is executed. Changes in the load state include a case where the fork height is changed from a low fork height to a high fork height or from a high fork height to a low fork height, and a case where the tilt angle is changed from the rearward tilt range to the outside of the range or from the outside of the range into the range. In this embodiment, the CPU 57 of the engine control apparatus 53 executes the drive control and functions as control section. Such a sudden change in the vehicle speed particularly occurs when the forklift 10 is moving with the accelerator pedal 32 fully depressed. For example, when the limitation state, in which the driving of the vehicle is limited, is shifted to the non-limitation state, in which no limitation is put, the forklift 10 is likely to be suddenly accelerated and become unstable since the limitation on the maximum vehicle speed or the acceleration/deceleration is cancelled. In contrast, when the non-limitation state is shifted to the limitation state, the forklift 10 is likely to be suddenly decelerated and become unstable since the limitation on the maximum vehicle speed or the acceleration/deceleration is put. When the contents of limitation are relaxed, the forklift 10 is likely to be suddenly accelerated and become unstable since the limitation on the maximum vehicle speed and the acceleration/deceleration is relaxed (that is, the maximum vehicle speed value is increased).

Hereafter, the contents of the drive control executed by the CPU 57 of the engine control apparatus 53 in this embodiment will be described with reference to FIG. 9.

The CPU 57 of the engine control apparatus 53 stores in the memory 58 the contents of limitation (the maximum vehicle speed value and the acceleration/deceleration value), which are instructed by limitation signals from the CPU 54 of the vehicle control apparatus 52. At this time, the CPU 57 stores in the memory 58 the contents of limitation instructed by limitation signals received in the previous control cycle and the contents of limitation instructed by limitation signals received in the current control cycle. The CPU 57 compares the contents of limitation of the previous control cycle stored in the memory 58 with the contents of limitation of the current control cycle, and determines whether there have been changes in the contents. Specifically, the CPU 57 determines whether the contents of limitation have been changed in response to a change in the fork height, and whether the contents of limitation have been changed in response to a change in the tilt angle. Changes in the contents of limitation in response to a change in the fork height include a change from the non-limitation state to the limitation state (hereafter, referred to as a change pattern P1) and a change from the limitation state to the non-limitation state (hereafter, referred to as a change pattern P2). Changes in the contents of limitation in response to a change in the tilt angle include changes in the maximum vehicle speed value and the acceleration/deceleration value in response to a change in the tilt angle from the rearward tilt range to the outside (hereafter, referred to as change pattern P3), and changes the maximum vehicle speed value and the acceleration/deceleration value in response to a change in the tilt angle from the outside of the rearward tilt range into the rearward tilting range (hereafter, referred to as change pattern P4).

Then, if there have no change in the contents of limitation on the vehicle driving, the CPU 57 adjusts the engine speed according to the contents of limitation of the current control cycle, thereby controlling the engine 16. Specifically, when the driving of the vehicle is not limited, the CPU 57 controls the throttle actuator 35 according to a detection signal (the amount of depression of the accelerator pedal 32) of the accelerator pedal position sensor 70 provided at the accelerator pedal 32, thereby adjusting the engine speed. When the driving of the vehicle is limited, the CPU 57 adjusts the engine speed using the engine speed adjustment data shown in FIG. 8 based on the maximum vehicle speed value and the acceleration/deceleration value stored in the memory 58.

On the other hand, when the contents of limitation on the driving of the vehicle have been changed, the CPU 57 determines which one of the change patterns P1 to P4 the change (the manner or degree of the change) corresponds to. Then, the CPU 57 adjusts the engine speed according to a predetermined control set for each change pattern, thereby controlling the engine 16. If the change corresponds to the change pattern P1, the CPU 57 uses the maximum vehicle speed value in accordance with the limitation contents instructed by the limitation signal, and the acceleration/deceleration level 1 as the acceleration/deceleration value instead of the acceleration/deceleration value (acceleration/deceleration level) instructed by the limitation signal. For example, even if the limitation signal instructs the maximum vehicle speed value of 15 km/h and the acceleration/deceleration level 4, the CPU 57 performs the control using the acceleration/deceleration level 1. If the change corresponds to the change pattern P2, the CPU 57 cancels the limitation on the maximum vehicle speed value (does not limit the maximum vehicle speed value), while using the acceleration/deceleration level 1 as the acceleration/deceleration value. That is, the CPU 57 executes the control by selecting the smallest value among the acceleration/deceleration values when the change corresponds to either the change pattern P1 or pattern P2. Accordingly, in the change pattern P1, a sudden deceleration due to the change from the non-limitation state to the limitation state is suppressed. In the change pattern P2, a sudden acceleration due to the change from the limitation state to the non-limitation state is suppressed.

If the change corresponds to the change pattern P3, the CPU 57 performs the control using the maximum vehicle speed value and the acceleration/deceleration value that correspond to the limitation contents instructed by the limitation signal. If the change corresponds to the change pattern P4, the CPU 57 uses the maximum vehicle speed value in accordance with the limitation contents instructed by the limitation signal, and the acceleration/deceleration level that is one degree lower than the acceleration/deceleration value (acceleration/deceleration level) instructed by the limitation signal. For example, in the case where the contents of limitation of the previous control cycle are the maximum vehicle speed value of 12 km/h and the acceleration/deceleration level 3, if the contents of limitation of the current control cycle are the maximum vehicle speed value of 15 m/h and the acceleration/deceleration level 4, the CPU 57 uses the maximum vehicle speed value of 15 km/h and selects the acceleration/deceleration level 3. That is, the CPU 57 executes the control by selecting the acceleration/deceleration values prior to the change when the acceleration/deceleration value increases according to a change in the limitation contents as in the change pattern P4. If the change corresponds to the change pattern P3, the maximum vehicle speed value is decreased, and the driving state of the forklift 10 is decelerated. Thus, in the present embodiment, no limitation is put on the acceleration/deceleration level. On the other hand, if the change corresponds to the change pattern P4, the maximum vehicle speed value is increased, and the driving state of the forklift 10 is accelerated. Thus, in the present embodiment, limitation is put on the acceleration/deceleration level to suppress a sudden acceleration.

When limiting the acceleration/deceleration level according to the drive control as described above (when the acceleration/deceleration level has been changed), the CPU 57 sets the acceleration/deceleration level to a normal level according to the non-operated state of the accelerator pedal 32. That is, the CPU 57 monitors whether the ON operation of the accelerator pedal 32 is shifted to the OFF operation. When detecting that the ON operation of the accelerator pedal 32 has been shifted to the OFF operation, the CPU 57 restores the acceleration/deceleration level to the previous level. More specifically, if the change corresponds to the change pattern P1, the CPU 57 restores the acceleration/deceleration value corresponding to the acceleration/deceleration level 1 to the acceleration/deceleration value (the acceleration/deceleration level) instructed by the limitation signal. When the change corresponds to the change pattern P2, the CPU 57 cancels the setting of the acceleration/deceleration level, and does not limit the acceleration/deceleration. When the change corresponds to the change pattern P3, since the CPU 57 has not changed the acceleration/deceleration level, the CPU 57 maintains the current state. If the change corresponds to the change pattern P4, the CPU 57 restores the acceleration/deceleration value to the acceleration/deceleration value (the acceleration/deceleration level) instructed by the limitation signal.

The present embodiment has the following advantages.

(1) During driving of the forklift 10, the maximum vehicle speed and the acceleration/deceleration are limited. When the contents of the limitation are changed during driving, the maximum vehicle speed value is controlled according to the changed limitation contents, while the acceleration/deceleration is controlled by selecting an acceleration/deceleration value less than the acceleration/deceleration value that corresponds to the changed contents. That is, when the limitation contents are changed, the acceleration/deceleration is regulated. As a result, even if the limitation contents are change during driving, a sudden acceleration or a sudden deceleration accompanying the change are suppressed. This ensures the driving stability of the vehicle. While the forklift 10 is moving, the stability of the forklift 10 is ensured, which stability would not be achieved by simply controlling the maximum vehicle speed and the acceleration/deceleration.

(2) While the operated state of the accelerator pedal 32 continues, the control of the acceleration/deceleration keeps being regulated. When the state of the accelerator pedal 32 is changed to the non-operated state, the regulation is cancelled. That is, in the drive control, when the driver performs the OFF operation of the accelerator pedal 32, the acceleration/deceleration level is restored to the normal level (the acceleration/deceleration level that corresponds to the load state). Therefore, even if the limitation contents are changed during driving, sufficient time is provided for the driver to deal with changes in the vehicle driving state that accompany the change of the limitation contents. This allows the driver to calmly deal with the situation. Also, the regulation on the acceleration/deceleration in the drive control is cancelled without disturbing the operation of the driver.

(3) When the contents of limitation are significantly changed, specifically, when the state in which limitation is put is shifted to the state in which no limitation is put during driving or when a reverse change of the state occurs, the smallest one of a plurality of control values is selected as the acceleration/deceleration value, and the control is performed according to the selected value. Thus, when the contents of the limitation are significantly changed and the driving state of the vehicle is greatly changed, accordingly, a sudden acceleration and a sudden deceleration are reliably suppressed and the driving stability is ensured.

(4) When a change in the limitation contents causes the acceleration/deceleration value after the change to be greater than the acceleration/deceleration value prior to the change, the acceleration/deceleration value prior to the change is selected, and the control is performed according to the selected value. That is, when a change in the limitation contents increases the maximum vehicle speed value and the acceleration/deceleration value, the vehicle is likely to be suddenly accelerated due to the relaxation of the limitation on the vehicle speed. Therefore, by regulating the acceleration/deceleration in such a case, the vehicle is permitted to be slowly accelerated to the maximum vehicle speed even if the maximum vehicle speed value is increased. This ensures the driving stability.

Second Embodiment

A second embodiment of the present invention will now be described. In the following embodiments, explanations of the same components of the already described embodiment will be omitted or simplified.

Figure 10:
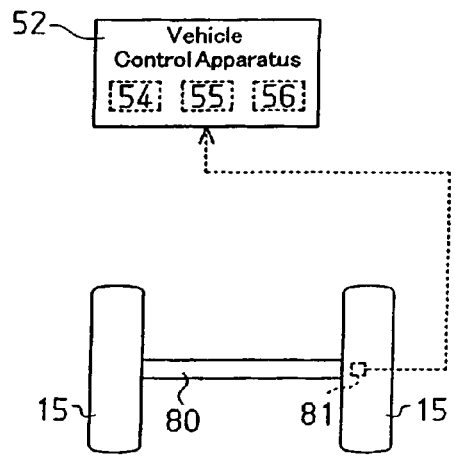
FIG. 10 is a diagrammatic view illustrating the structure of a forklift according to a second embodiment.

FIG. 10 illustrates the configuration of a forklift 10 according to the present embodiment. As shown in FIG. 10, a wheel angle sensor 81 is provided at one end of an axle 80 of the steered wheels 15. The wheel angle sensor 81 detects a wheel angle that indicates the steered angle of the steered wheels 15. In the present embodiment, the wheel angle sensor 81 is, for example, a potentiometer. The wheel angle sensor 81 is connected to the vehicle control apparatus 52 and outputs a detection signal (wheel angle signal) corresponding to the wheel angle.

Figure 11:
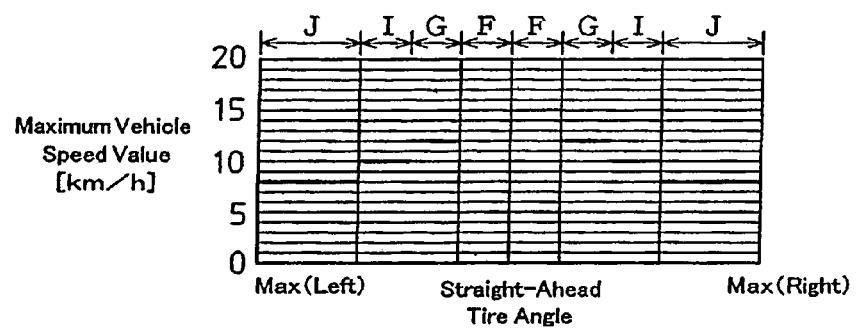
FIG. 11 is a relational diagram showing the relationship between the wheel angle and a maximum vehicle speed value.
Figure 12:
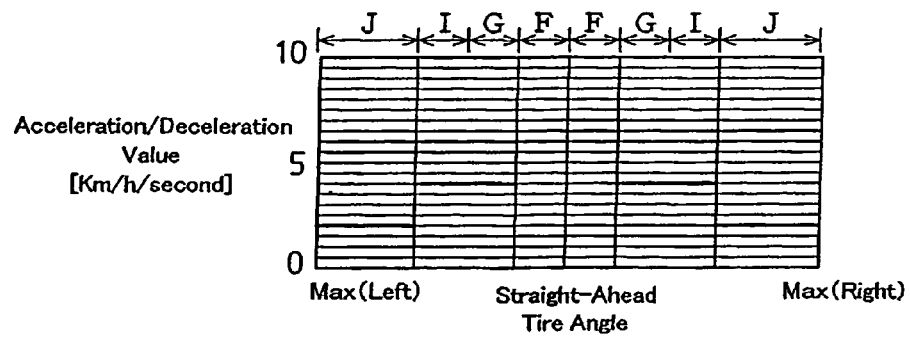
FIG. 12 is a relational diagram showing the relationship between the wheel angle and an acceleration/deceleration value.

In the forklift 10 of the present embodiment, when the load state is in a region corresponding to the fork height equal to or higher than the height H and the load weight less than the weight W in the necessity determining data of FIG. 4 (map data), the maximum vehicle speed value and the acceleration/deceleration value are extracted (determined) based on vehicle speed computing data (map data) shown in FIG. 11 and acceleration/deceleration computing data shown in FIG. 12. The vehicle speed computing data of FIG. 11 and the acceleration/deceleration computing data of FIG. 12 are stored in the memory 55 of the vehicle control apparatus 52.

The vehicle speed computing data of FIG. 11 defines the maximum vehicle speed value (km/h) in relation to the wheel angle. Specifically, the wheel angle corresponding to straight-ahead driving is set as a reference, and the wheel angle corresponding to the right turn and the left turn is divided into a plurality of regions (in this embodiments, four regions, or regions F, G, I, and J). The maximum vehicle speed value is set for each region. The notation "max" in FIG. 11 indicates the maximum wheel angles when the steered wheels 15 are steered either to the right or to the right. In the present embodiment, the maximum vehicle speed value in the region F, which includes the wheel angle of the straight-ahead driving, is not limited. The maximum vehicle speed value is lowered in regions of a greater wheel angle, that is, as the wheel angle approaches the maximum value. In the regions G, I, and J, the maximum vehicle speed value is set to 12 km/h, 10 km/h, and 8 km/h, respectively.

The acceleration/deceleration computing data of FIG. 12 defines the acceleration/deceleration value (km/h/second) in relation to the wheel angle. Specifically, the wheel angle corresponding to straight-ahead driving is set as a reference, and the wheel angle corresponding to the right turn and the left turn is divided into a plurality of regions (in this embodiment, four regions, or regions F, G, I, and J). The acceleration/deceleration value is set for each region. The notation "max" in FIG. 12 indicates the maximum wheel angles when the steered wheels 15 are steered either to the right or to the right. In the present embodiment, the acceleration/deceleration value in the region F, which includes the wheel angle of the straight-ahead driving is not limited. The acceleration/deceleration value is reduced in regions of a greater wheel angle, that is, as the wheel angle approaches the maximum value. In the regions G and I, the acceleration/deceleration value is set to 4 km/h/second. In the region J, the acceleration/deceleration value is set to 2 km/h/second. Acceleration/deceleration values corresponding to the acceleration/deceleration levels 2 and 4 described in the first embodiment are set as the acceleration/deceleration computing data in the acceleration/deceleration computing data shown in FIG. 12 of the present embodiment.

Next, the contents of the control executed by the CPU 54 of the vehicle control apparatus 52 in this embodiment will be described. In the present embodiment, the CPU 54 executes the limitation determining process shown in FIG. 7 with a part thereof modified. Hereafter, the differences from the procedure according to the first embodiment will mainly be discussed below.

At step S10 of the limitation determining process shown in FIG. 7, the CPU 54 obtains information related to the wheel angle in addition to the information related to the fork height, the load weight, and the tilt angle. The CPU 54 obtains the wheel angle based on a detection signal of the wheel angle sensor 81. Subsequently, the CPU 54 refers to the necessity determining data shown in FIG. 4 at step S11 of the limitation determining process, and determines whether to limit the maximum vehicle speed and the acceleration/deceleration at step S12. At this time, the CPU 54 determines that the outcome at step S12 is positive if the load state corresponds to a fork height equal to or higher than the height H and a load weight equal to or greater than the weight W, and executes the process from step S13 as in the first embodiment.

On the other hand, when the load state corresponds to a fork height equal to or higher than the height H and a load weight less than the weight W, the CPU 54 determines whether the region to which the wheel angle obtained at the step S10 belongs to is one of the regions G, I, and J defined in relation to the vehicle speed computing data and the acceleration/deceleration data of FIG. 12. When the result of the above determination is positive, the CPU 54 determines that the outcome of step S12 is positive. When the outcome of the determination result is negative, the CPU 54 determines that outcome of step S12 is negative. When the wheel angle belongs to one of the regions G, I, and J, the CPU 54 determines that the outcome at step S12 is positive. In this case, the CPU 54 refers to the vehicle speed computing data of FIG. 11 at step S13, and extracts the maximum vehicle speed value at step S14 based on the wheel angle obtained at step S10. For example, when the wheel angle belongs to the region G, the CPU 54 extracts 12 km/h as the maximum vehicle speed value. Subsequently, the CPU 54 refers to the acceleration/deceleration computing data of FIG. 12 at step s15, and extracts the acceleration/deceleration value at step S16 based on the wheel angle obtained at step S10. For example, when the wheel angle belongs to the region G, the CPU 54 extracts 4 km/h/second as the acceleration/deceleration value. Then, the CPU 54 sends a limitation signal for instructing the maximum vehicle speed value and the acceleration/deceleration value extracted at step S14 and step S16 to the engine control apparatus 53. After receiving the control signal, the CPU 57 of the engine control apparatus 53 adjusts the engine speed based on engine speed adjustment data shown in FIG. 8 as in the first embodiment.

Therefore, in addition to the advantages (1) to (4) of the first embodiment, the present embodiment provides the following advantages.

(5) The maximum vehicle speed and the acceleration/deceleration are limited according to the wheel angle. For example, when the forklift 10 is started with the wheel angle direction at an angle other than the wheel angle of the straight-ahead driving (in a state the steered wheels 15 are steered), the wheels may slip or the vehicle may become unstable depending on the load state (for example, if the fork height is high). Therefore, the driving stability is ensured by limiting the maximum vehicle speed and the acceleration/deceleration in accordance with the wheel angle. Not only at the start, but also at a turn, the driving stability is ensured by limiting the maximum vehicle speed and the acceleration/deceleration in accordance with the load state.

Third Embodiment

A third embodiment of the present invention will now be described. This embodiment may be applied to the first and second embodiments.

In this embodiment, load fluctuation generated during driving of the forklift 10 is monitored, and a control procedure for changing the contents of limitation on the driving in accordance with the load fluctuation is executed. The load fluctuation in the present embodiment refers to the weight of the load mounted on the loading device 12 (the forks 22). When the forklift 10 is moving, the accompanying vibration causes a load to vibrate, and the value of a detection signal outputted by the load sensor 66 is less stable than the case where the forklift 10 is not moving. Therefore, in the limitation determining process shown in FIG. 7, the contents of limitation is likely to be repeatedly changed during driving by the influence of the detection signal indicating the load weight obtained at step S10 (influence of load fluctuation). Referring to the necessity determining data shown in FIG. 4, when the forklift 10 is carrying a load the weight of which is close to the weight W, or the boundary between the limitation region and the non-limitation region, load fluctuation during driving causes the load state to fluctuate between the limitation region and the non-limitation region. In such a case, the limitation contents are likely to be greatly changed between the state in which the vehicle driving is limited and the state in which the vehicle driving is not limited. It is thus difficult to ensure the driving stability.

Accordingly, in the present embodiment, two modes are prepared in accordance with the vehicle speed of the forklift 10. The two modes include a mode in which the limitation contents are determined in response to load fluctuation and a mode in which the limitation contents are determined regardless of load fluctuation. Specifically, until the vehicle speed reaches a load fluctuation vehicle speed, which is a reference value (in this embodiment 3 km/h), the limitation contents are determined using the load weight obtained at step S10 of the limitation determining process shown in FIG. 7. On the other hand, after the vehicle speed reaches the load fluctuation vehicle speed, the value of the load weight at the time when the vehicle speed reaches the load fluctuation vehicle speed is set as a fixed value, and the limitation contents are determined in the limitation determining process.

Hereafter, the contents of the control executed by the CPU 54 of the vehicle control apparatus 52 in this embodiment will be described. In the present embodiment, the CPU 54 executes the limitation determining process shown in FIG. 7 with a part thereof modified. Hereafter, the differences from the procedure according to the first embodiment will mainly be discussed below.

At step S10 of the limitation determining process shown in FIG. 7, the CPU 54 obtains information related to the vehicle speed in addition to the information related to the fork height, the load weight, and the tilt angle. The CPU 54 obtains the vehicle speed based on a detection signal of the vehicle speed sensor 63. Then, the CPU 54 compares the obtained vehicle speed with the load fluctuation vehicle speed, and determines whether the obtained vehicle speed has reached the load fluctuation vehicle speed. If the decision outcome is negative, the vehicle speed has not reached the load fluctuation vehicle speed. In this case, the CPU 54 stores the load weight obtained at step S10 in the memory 55, and executes the process from step S11 using the obtained load weight. On the other hand, if the result of the above decision outcome is positive, the vehicle speed has reached the load fluctuation vehicle speed. In this case, the CPU 54 does not store the load weight obtained at step S10 in the memory 55 (does not update the value of the load weight), and executes the process from step S11 using the load weight stored in the memory 55. That is, the CPU 54 updates the value of the load weight in the memory every time the CPU 54 obtains information related to the load weight until the vehicle speed reaches the load fluctuation vehicle speed, and executes the limitation determining process using the obtained load weight. After the vehicle speed has reached the load fluctuation vehicle speed, the CPU 54 stops updating the value of the load weight, and executes the limitation determining process using the load weight stored in the memory 55.

Therefore, in addition to the advantages (1) to (4) of the first embodiment, the present embodiment provides the following advantages.

(6) Until the vehicle speed reaches the load fluctuation vehicle speed (reference value), whether the maximum vehicle speed and the acceleration/deceleration should be limited is determined through the limitation determining process based on the detected load weight. On the other hand, after the vehicle speed reaches the load fluctuation vehicle speed (reference value), the load weight is set to a fixed value and whether the maximum vehicle speed and the acceleration/deceleration should be limited is determined using the fixed value. Therefore, even if the weight of the load on the loading device 12 (the forks 22) fluctuates in the control procedure due to vibration generated during driving of the forklift 10, the limitation contents are not changed accordingly. This prevents a sudden acceleration and a sudden deceleration caused by a change in the contents of limitation. This ensures the driving stability.

(7) The load fluctuation speed is set to a value in a low speed region (in this embodiment 3 km/h). In the case where the load fluctuation vehicle speed is not used and the load weight at the start of the vehicle is used as a fixed value for determining whether to put limitation, if an operation for scooping up a load at a very low speed is performed, limitation cannot be put on the vehicle driving. When such an operation is performed, the load at the start of the forklift 10 is zero, and no limitation is put on the vehicle driving at the start. Thereafter, the load is mounted on the forklift 10. Therefore, after the load is mounted, the forklift 10 moves without any limitation, which can make the driving unstable. On the other hand, if the load fluctuation vehicle speed is set to a value with a relatively great tolerance, for example, 10 km/h, the period until the vehicle speed reaches the load fluctuation vehicle speed is extended. During such a period, the contents of limitation are repeatedly changed by the influence of the load fluctuation. This causes the driving to be unstable. Therefore, by setting an appropriate value as the load fluctuation vehicle speed, limitations on the vehicle driving are put at an appropriate point in time, and the driving stability is ensured.

Fourth Embodiment

A fourth embodiment of the present invention will now be described. In the following embodiment, explanations of the same components of the already described embodiment will be omitted or simplified.

Figure 13A:
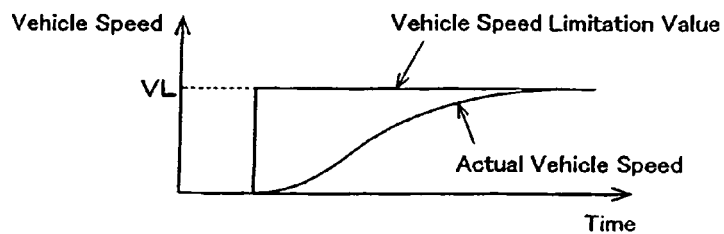
FIG. 13A is a relational diagram for explaining an operation of a fourth embodiment, in which a vehicle speed limitation value is not changed at the start of driving.

In the above illustrated embodiments, the CPU 54 of the vehicle control apparatus 52 executes the limitation determining process. When it is determined that the driving of the vehicle should be limited, the CPU 57 of the engine control apparatus 53 adjusts the engine speed based on the maximum vehicle speed value and the acceleration/deceleration value in accordance with the contents of limitation instructed by a limitation signal outputted by the CPU 54 of the vehicle control apparatus 52. Therefore, if the load weight is great when the forklift 10 is not moving, since the target vehicle speed is limited, the acceleration at the start is small and it takes time for the speed of the forklift 10 to reach the target vehicle speed. That is, the vehicle speed limitation value is small as shown in FIG. 13A. Thus, if the difference between the actual vehicle speed and the target vehicle speed (vehicle speed limitation value) is computed and the engine speed is adjusted to realize acceleration/deceleration in accordance with the computed difference, the acceleration will be slow and it will take time for the actual vehicle speed to reach the target vehicle speed. This reduces the working efficiency.

Figure 13B:
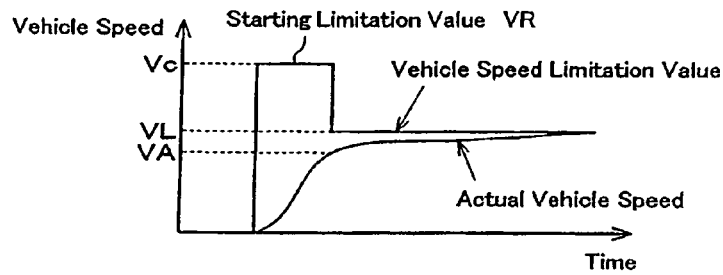
FIG. 13B is a relational diagram for explaining an operation of the fourth embodiment, in which the vehicle speed limitation value is changed at the start of driving.

However, in the case where the maximum vehicle speed is limited and the limitation value is small, there is no harm in increasing the acceleration during a period from when the forklift 10 (vehicle) is started from the stopped state to a value greater than the acceleration that corresponds to the small vehicle speed limitation value. In the present embodiment, at the start of the vehicle from the stopped state, the CPU 57 of the engine control apparatus 53 adjusts the engine speed by setting the vehicle speed limitation value to a starting limitation value VR, which is higher than the limitation value VL of the maximum vehicle speed, until the actual vehicle speed reaches a restoration speed VA, which is a value of a predetermined ratio relative to the limitation value of the maximum vehicle speed determined by the CPU 54 of the vehicle control apparatus 52 in the limitation determining process. In the present embodiment, the starting limitation value VR is set to a constant value Vc. That is, as shown in FIG. 13B, the vehicle speed limitation value (speed limit) is temporarily increased from the start of the vehicle. When the actual vehicle speed reaches or surpasses the restoration speed VA, the vehicle speed limitation value is set to the limitation value VL of the maximum vehicle speed and the drive control of the forklift 10 is executed.

No problem is caused if the road on which the forklift 10 travels is flat and the actual vehicle speed monotonically increases from the starting until it reaches the limitation value VL of the maximum vehicle speed, or the target vehicle speed. However, depending on the condition of the road, after the actual vehicle speed reaches or surpasses the restoration speed VA and the vehicle speed limitation value is changed from the starting limitation value VR (the constant value Vc) to the limitation value VL, the influence of the road surface can cause the actual vehicle speed to repeatedly fall below and surpass the restoration speed VA again (speed fluctuation). In such a case, if the vehicle limitation value is immediately returned to the starting limitation value VR when the actual vehicle speed falls below the restoration speed VA, acceleration and deceleration will be frequently repeated. To prevent such a phenomenon, hysteresis is used when the target vehicle speed is returned to the starting limitation value VR.

The memory 58 of the engine control apparatus 53 stores a map defining the relationship between the actual vehicle speed and the vehicle speed limitation value (target vehicle speed). The CPU 57 of the engine control apparatus 53 sets the vehicle speed limitation value to the starting limitation value VR (the constant value Vc) or the limitation value VL of the maximum vehicle speed value. According to the map, in a period from when the vehicle speed is 0 km/h to when it reaches the restoration speed VA, the vehicle speed limitation value corresponds to the starting limitation value VR. When the actual vehicle speed is equal to or greater than the restoration speed VA, the vehicle speed limitation value corresponds to the limitation value VL. Also, after the actual vehicle speed reaches or surpasses the restoration speed VA and the vehicle speed limitation value is set to the limitation value VL, when the actual vehicle speed falls to or below a hysteresis speed VB, which is less than the restoration speed VA, the vehicle speed limitation value is set to the starting limitation value VR.

The starting limitation value VR is a value that is greater by a predetermined degree than the maximum vehicle speed determined by the CPU 54 of the vehicle control apparatus 52 in the limitation determining process. Alternatively, the starting limitation value VR is set to correspond to the range of the maximum vehicle speed. The restoration speed VA may be selected from a plurality of values in accordance with the load state or may be constant value regardless of the load state.

For example, in the case where the starting limitation value VR is set to a value that is greater than the maximum vehicle speed determined in the limitation determining process by 25%, if the limitation value VL is 8 km/h, the starting limitation value VR is set to 10 km/h, the restoration speed VA is set to 6 km/h (VL−2), and the hysteresis speed VB is set to 4 km/h (VL−4).

Figure 14:
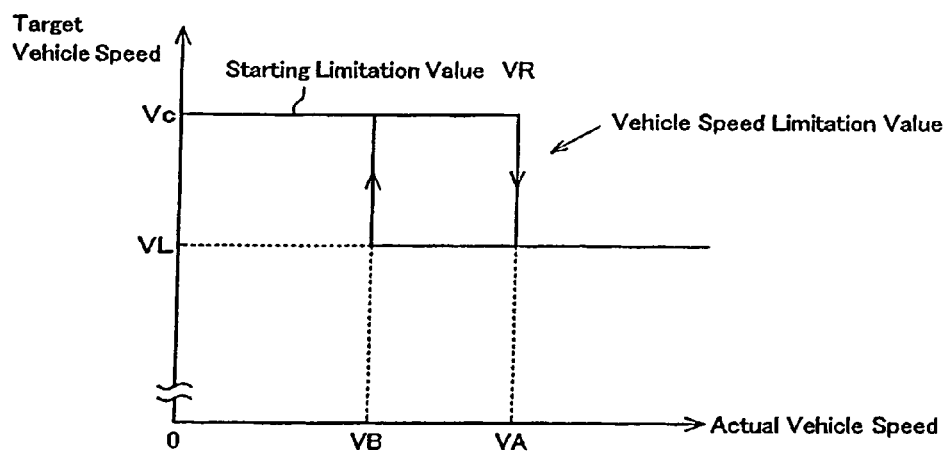
FIG. 14 is a relational diagram showing the relationship between an actual vehicle speed and a target vehicle speed in a case where a hysteresis speed is used.

When executing the vehicle speed limitation at the start of the forklift 10, the CPU 57 sets the vehicle speed limitation value, which is a target vehicle speed, according to the map of FIG. 14. Based on the engine speed adjusting data that corresponds to the difference between the vehicle speed limitation value and the actual vehicle speed, the CPU 57 controls the engine speed.

In addition to the advantages of the previous embodiments, the present embodiment provides the following advantages.

(8) When the vehicle is started from the stopped state, the limitation value VL determined to be appropriate for the load state is not equalized with the vehicle speed limitation value at the time of the start. However, until the actual vehicle speed reaches the restoration speed VA, which is a value of a predetermined ratio to the limitation value, the starting limitation speed VR, which is higher than the limitation value VL, is used as the vehicle speed limitation value. As a result, the difference between the actual vehicle speed and the target vehicle speed is increased. This prevents the acceleration from being undesirably reduced. Accordingly, the working efficiency is not reduced.

(9) The starting limitation value VR is set to the constant value Vc. After the actual vehicle speed reaches or surpasses the restoration speed VA, and the vehicle speed limitation value is set to the limitation value VL to adjust the engine speed, if the actual vehicle speed falls below the restoration speed VA, the CPU 57 sets the vehicle speed limitation value to the starting limitation value VR when the actual vehicle speed falls to or below the hysteresis speed VB, which is lower than the restoration speed VA, thereby executing the drive control of the vehicle. Therefore, when the vehicle is started from the stopped state, even if the actual vehicle speed falls below the restoration speed VA due to the influence of the road surface after the actual vehicle speed reaches or surpasses the restoration vehicle speed VA and the vehicle speed limitation value is changed, the vehicle limitation value is not immediately changed. That is, since the hysteresis speed VB is set, frequent repetitions of acceleration and decoration are suppressed.

Fifth Embodiment

A fifth embodiment of the present invention will now be described. This embodiment is different from the fourth embodiment in the method for setting the vehicle speed limitation value when the vehicle speed is limited at the start of the vehicle from the stopped state. Other than this difference, the fifth embodiment is the same as the fourth embodiment, and explanations of the same components of the fourth embodiment will be omitted or simplified.

Figure 15:
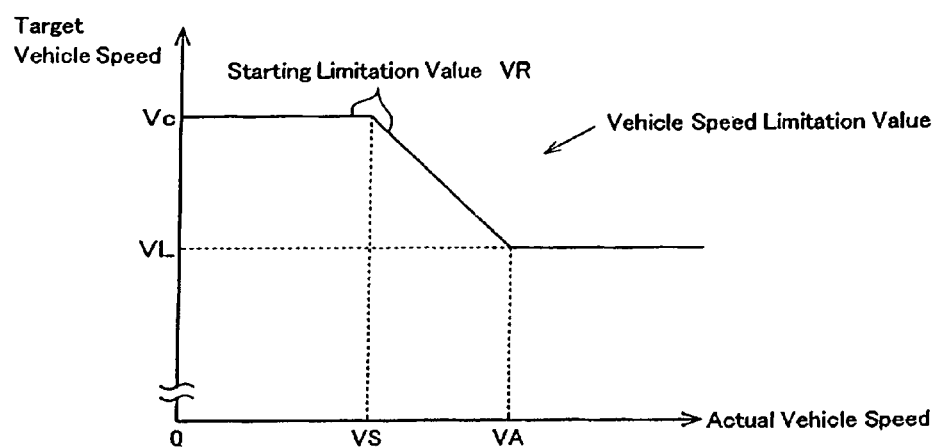
FIG. 15 is a relational diagram showing the relationship between an actual vehicle speed and a target vehicle speed according to a fifth embodiment.

In this embodiment, the starting limitation value VR is not constant. Until the actual vehicle speed reaches a limitation value reduction starting speed VS, which is lower than the restoration speed, the starting limitation value VR is set to the constant value Vc. When the actual vehicle speed is equal to or greater than the limitation value reduction starting speed VS, the starting limitation value VR is reduced to the limitation value VL of the maximum vehicle speed as the actual vehicle speed is increased. The memory 58 of the engine control apparatus 53 stores a map that defines the relationship between the vehicle speed limitation value (target vehicle speed) and the actual vehicle speed. FIG. 15 shows one example of the map. In this map, the relationship between the vehicle speed limitation value and the actual vehicle speed is defined such that, until the vehicle speed reaches the limitation value reduction starting value VS from the 0 km/h, the vehicle speed limitation value is set to the constant value Vc, and when the actual vehicle speed is equal to or greater than the limitation value reduction starting value VS, the vehicle speed limitation value is reduced to the limitation value VL in proportion to increase of the actual vehicle speed.

When executing the vehicle speed limitation at the start of the vehicle from the stopped state, the CPU 57 of the engine control apparatus 53, the CPU 57 of the engine control apparatus 53 sets the vehicle speed limitation value (target vehicle speed) based on the map and adjusts the engine speed, accordingly. Unlike the fourth embodiment, the vehicle speed limitation value is not immediately changed from the constant value Vc to the limitation value VL. However, after the actual vehicle speed reaches the limitation value reduction starting speed VS, the vehicle speed limitation value is gradually reduced to the limitation value VL as the actual vehicle speed increases.

Thus, in addition to the advantages of the first to third embodiments, the present embodiment provides the following advantages.

(10) When the vehicle is started from the stopped state, the limitation value VL determined to be appropriate for the load state is not equalized with the vehicle speed limitation value at the time of the start. However, until the actual vehicle speed reaches the restoration speed VA, which is a value of a predetermined ratio to the limitation value, a value greater than the limitation value VL is used as the vehicle speed limitation value. As a result, the difference between the actual vehicle speed and the target vehicle speed is increased. This prevents the acceleration from being undesirably reduced. Accordingly, the working efficiency is not reduced.

(11) At the start of the vehicle from the stopped state, the vehicle speed limitation value is set to the constant value Vc until the actual vehicle speed reaches the limitation value reduction starting speed VS, which is lower than the restoration speed VA. When the actual vehicle speed is equal to or greater than the limitation value reduction starting speed VS, the vehicle speed limitation value is reduced to the limitation value VL as the actual vehicle speed is increased. Thus, even if the actual vehicle speed is temporarily reduced due to, for example, the influence of the road surface, the target vehicle speed is not significantly fluctuated, and the vehicle is accelerated in a stable manner. When the vehicle is started while being turned, the engine speed readily follows temporary changes in the driving resistance in the turn.

The above illustrated embodiment may be modified as follows.

Although the illustrated embodiments are applied to a torque converter type forklift 10 (torque converter vehicle), the present invention may applied to clutch type forklift (clutch vehicle) or Hydrostatic Transmission vehicles (HST vehicle).

In the illustrated embodiments, it may be configured that the advancing electromagnetic valve 44 and the reversing electromagnetic valve 45 are fully closed when the current to the solenoids is zero, and are fully open when a current is supplied to the solenoids.

In the illustrated embodiments, the advancing relay circuit 60 and the reversing relay circuit 61 may be formed by normally-open contacts instead of normally-closed contacts. In the case where normally-open contacts are used, the advancing electromagnetic valve 44 and the reversing electromagnetic valve 45 are energized when the normally-open contacts are closed, and de-energized when the contacts are open.

In the illustrated embodiments, the structures of the advancing clutch 42 and the reversing clutch 43 may be changed. That is, it may be configured that an increase in the clutch pressure of each pressure receiving chamber 42a, 43a increases the engaging force, and a decrease in the clutch pressure reduces the engaging force.

In the illustrated embodiments, when limiting the acceleration/deceleration, the CPU 54 of the vehicle control apparatus 52 may send a signal indicating the acceleration/deceleration level to the engine control apparatus 53 instead of the limited acceleration/deceleration value.

In the illustrated embodiments, the parameters used in the determination whether the maximum vehicle speed and the acceleration/deceleration should be limited, and the computation of the maximum vehicle speed and the acceleration/deceleration may be changed. For example, the maps may be configured for performing the above determination based on the fork height and the load weight, and for computing the maximum vehicle speed value and the acceleration/deceleration value. In the necessity determining data shown in FIG. 4, the regions of the fork height and load weight may be segmented into smaller regions to provide two or more limitation regions. In this case, the vehicle speed computation data shown in FIG. 5 and the acceleration/deceleration computation data shown in FIG. 6 are provided for each of the limitation regions, so that data for computing the maximum vehicle speed value and the acceleration/deceleration value is changed for each limitation region. When segmenting the regions of the fork height, the mast assembly 19 may be provided with two or more limit switches for detecting the fork height. Alternatively, the mast assembly 19 may be provided with a reel sensor for continuously detecting the fork height.

Any of the previous embodiments may be configured such that the CPU 54 of the vehicle control apparatus 52 determines whether the contents of limitation have been changed, and that, in accordance with the above determination result, the CPU 54 instructs the maximum vehicle speed value and the acceleration/deceleration value to the CPU 57 of the engine control apparatus 53. The CPU 57 performs the drive control according to the instruction. That is, the CPU 54 of the vehicle control apparatus 52 and the CPU 57 of the engine control apparatus 53 may form control section.

In the first embodiment, when a change of the contents of limitation on the vehicle driving corresponds to the change pattern P1 or P2, the smallest acceleration/deceleration value (acceleration/deceleration level 1) is selected among several acceleration/deceleration values (four acceleration/deceleration levels 1 to 4). However, the acceleration/deceleration value selected in the case of the change pattern P1 or P2 may be changed as in the following first to fourth modifications. The first modification and the second modification are modifications of the change pattern P1, and the third modification is a modification of the change pattern P2. According to the first modification, in the case of the change pattern P1, an acceleration/deceleration value that corresponds to the limitation contents after the change is selected, and the control is executed, accordingly. That is, in the first modification, the control is executed according to the limitation contents as in the change pattern P3. According to the second modification, in the case of the change pattern P1, an acceleration/deceleration value smaller than the acceleration/deceleration value that corresponds to the limitation contents after the change is selected, and the control is executed, accordingly. For example, in the second modification, if the acceleration/deceleration value that corresponds to the limitation contents after the change is the acceleration/deceleration level 3, the deceleration/deceleration level 2 is selected, and the control is executed, accordingly. In the second modification, if the acceleration/deceleration value that corresponds to the limitation contents after the change is the acceleration/deceleration level 1, the deceleration/deceleration level 1 is selected. According to the third modification, in the case of the change pattern P2, an acceleration/deceleration value other than the acceleration/deceleration level 1, that is, the acceleration/deceleration level 2, the acceleration/deceleration level 3, or the acceleration/deceleration level 4 is selected, and the control is executed, accordingly. As described in the previous embodiments, the limitation contents are greatly changed in the change patterns P1 and P2. Thus, as described in the previous embodiments, it is preferable that the acceleration/deceleration level 1 be selected, and the control be executed, accordingly. However, if sudden acceleration and sudden deceleration can be avoided by limiting the acceleration/deceleration value, an acceleration/deceleration level other than the acceleration/deceleration level 1, which corresponds to the smallest acceleration/deceleration value, may be selected and the control may be executed, accordingly.

In the first embodiment, the acceleration/decoration value that is selected when a change of the limitation contents of the vehicle driving corresponds to the change pattern P3 or P4 may be changed. In the change pattern P3, an acceleration/deceleration that is smaller than the acceleration/deceleration value corresponding to the limitation contents after the change may be selected, and the control may be executed, accordingly. Alternatively, as the acceleration/deceleration value selected in the case of the change pattern P3 or P4, the smallest one of a plurality of acceleration/deceleration values (in the illustrated embodiments, the acceleration/deceleration level 1) may be selected, and the control may be executed, accordingly.

In the second embodiment, a steering wheel angle sensor may be provided at the steering shaft supporting the steering wheel 28, and, instead of the wheel angle, the actual steering wheel angle of the steering wheel 28 may be detected as the steered angle of the steered wheels 15. The control is be executed based on the detected actual steering wheel angle. The steering wheel angle sensor is, for example, an optical rotary encoder.

In the third embodiment, the value of the load fluctuation vehicle speed may be changed.

In the fourth embodiment, the rate of increase of the starting limitation value VR to the limitation value VL is not limited to 25%. The rate of increase may be varied in accordance with the magnitude of the limitation value VL.

The fifth embodiment may be modified as long as, when the actual vehicle speed is equal to or greater than the limitation value reduction starting speed VS, the vehicle speed limitation value is reduced as the actual vehicle speed increases. That is, the vehicle speed limitation value does not need to be reduced in proportion to the actual vehicle speed. Specifically, the vehicle speed limitation value may be reduced in accordance with a relationship with the actual vehicle speed other than a linear function.

In the fifth embodiment, in the case where it is configured that the starting limitation value VR is reduced (decreased) when the actual vehicle speed is equal to or greater than the limitation value reduction starting speed VS, the starting limitation value VR may be determined in accordance with time that has elapsed since the actual vehicle speed reaches the limitation value reduction starting speed VS. For example, the starting limitation value VR may be reduced in proportion to the elapsed time.

The invention claimed is:

1. A drive control apparatus for a forklift, the forklift including an engine, a drive wheel, a power transmission mechanism for transmitting power of the engine to the drive wheel, and a loading device that is provided at a front portion of the forklift and mounts a load, the drive control apparatus comprising:

a load state determining section, wherein the load state determining section detects a load state of the loading device, and, based on the detected load state, determines whether to limit a maximum vehicle speed and an acceleration/deceleration during traveling of the forklift;

a limitation contents determining section that determines limitation contents regarding the maximum vehicle speed and the acceleration/deceleration based on a determination result of the load state determining section, wherein, when the determination result of the load state determining section is negative, the limitation contents determining section determines not to limit the maximum vehicle speed and the acceleration/deceleration, and wherein, when the determination result of the load state determining section is positive, the limitation contents determining section selects, from a plurality of maximum vehicle speed limitation values and a plurality of acceleration/deceleration limitation values that are previously set according to load states, a maximum vehicle speed limitation value and an acceleration/deceleration limitation value that are appropriate for the detected load state; and a control section that adjusts a speed of the engine based on the limitation contents determined by the limitation contents determining section, thereby controlling driving of the forklift, wherein, when the limitation contents determined by the limitation contents determining section are changed, the control section executes drive control related to the maximum vehicle speed according to the limitation contents that are set after the change, and the control section selects an acceleration/deceleration limitation value from the acceleration/deceleration limitation values according to the pattern of the change of the limitation contents and executes drive control related to the acceleration/deceleration to limit the acceleration/deceleration of the forklift by using the selected acceleration/deceleration limitation value.

2. The drive control apparatus according to claim 1, further comprising an acceleration instructing device that is operated by a driver to instruct acceleration of the forklift, the acceleration instructing device being configured to instruct acceleration when in an operated state and not to instruct acceleration when in a non-operated state, wherein, in a case where the limitation contents are changed, the control section executes the drive control while the operated state of the acceleration instructing device continues, ends the drive control when the acceleration instructing device is shifted to the non-operated state, and returns the acceleration/deceleration limitation value to the acceleration/deceleration limitation value that corresponds to the limitation contents that are set after the change made by the limitation contents determining section.

3. The drive control apparatus according to claim 1, wherein, when the limitation contents are changed from an unlimited state in which the maximum vehicle speed and the acceleration/deceleration are not limited to a limited state where the maximum vehicle speed and the acceleration/deceleration are limited or when the limitation contents are changed from the limited state to the unlimited state, the control section selects the smallest value of the acceleration/deceleration limitation values, and executes the drive control by using the selected smallest acceleration/deceleration limitation value.

4. The drive control apparatus according to claim 1, wherein the load state determining section determines whether to limit the maximum vehicle speed and the acceleration/deceleration based on a determination condition that includes at least one of a height of the loading device and the weight of a load mounted on the loading device,
  wherein, in a case where the determination results of the load state determining section is positive, the limitation contents determining section selects a smaller maximum vehicle speed limitation value and a smaller acceleration/deceleration limitation value as the load state indicates a higher height or a greater weight, and
  wherein, in a case where the limitation contents are changed with the limitations being put, the control section executes the drive control by using the acceleration/deceleration limitation value that is set before the change if the acceleration/deceleration limitation value that is set after the change is greater than the acceleration/deceleration limitation value that is set before the change.

5. The drive control apparatus according to claim 4, wherein the load state determining section detects a vehicle speed and the weight of the load, and, until the detected vehicle speed surpasses a predetermined reference value, the load state determining section determines whether to limit the maximum vehicle speed and the acceleration/deceleration based on the detected weight of the load, and wherein, after the vehicle speed reaches the reference value, the load state determining section sets, as a fixed value, the weight of the load detected at the time when the vehicle speed reaches the reference value, and determines whether to limit the maximum vehicle speed and the acceleration/deceleration by using the fixed value.

6. The drive control apparatus according to claim 1, wherein the load state determining section determines whether to limit the maximum vehicle speed and the acceleration/deceleration based on the load state and a steered angle of a steered wheel of the forklift, and
  wherein, when the determination result of the load state determining section is positive, the limitation contents determining section selects, from a plurality of maximum vehicle speed limitation values and a plurality of acceleration/deceleration limitation values, which are previously set according to steered angles, a maximum vehicle speed limitation value and an acceleration/deceleration limitation value that are appropriate for the steered angle.

7. The drive control apparatus according to claim 1, wherein the control section computes a difference between an actual vehicle speed and a target vehicle speed, and adjusts the speed of the engine to realize an acceleration/deceleration that corresponds to the difference, and
  wherein, at start of the forklift from a stopped state, the control section sets, until the actual vehicle speed reaches a restoration speed that is a value of a predetermined ratio to a maximum vehicle speed limitation value determined to be appropriate for the load state, a starting limitation value that is greater than the maximum vehicle speed limitation value, and adjusts the engine speed by using the starting limitation value, and wherein, when the actual vehicle speed reaches or surpasses the restoration vehicle speed, the control section adjusts the engine speed by using the maximum vehicle speed limitation value.

8. The drive control apparatus according to claim 7, wherein the starting limitation value is a constant value, wherein, in a case where the actual vehicle speed falls below the restoration speed after reaching or surpassing the restoration speed, the control section adjusts the engine speed by using the starting limitation value when the actual vehicle speed falls to or below a hysteresis speed that is lower than the restoration speed.

9. The control apparatus according to claim 7, wherein the starting limitation value is set to a constant value until the actual vehicle speed reaches a limitation value reduction starting speed that is lower than the restoration speed, and wherein, when the actual vehicle speed is equal to or greater than the limitation value reduction starting speed, the starting limitation value is reduced to the maximum vehicle speed limitation value as the actual vehicle speed increases.

10. A drive control method for a forklift, the forklift including an engine, a drive wheel, a power transmission mechanism for transmitting power of the engine to the drive wheel, and a loading device that is provided at a front portion of the forklift and mounts a load, the drive control method comprising:
  detecting a load state of the loading device, and determining, based on the detected load state, whether to limit a maximum vehicle speed and an acceleration/deceleration during traveling of the forklift;
  determining limitation contents regarding the maximum vehicle speed and the acceleration/deceleration based on a determination result of whether to put the limitations, wherein, when the determination result is such that the limitations should not be put, it is determined not to limit the maximum vehicle speed and the acceleration/deceleration, and wherein, when the determination result is such that the limitations should be put, a maximum vehicle speed limitation value and an acceleration/deceleration limitation value that are appropriate for the detected load state are selected from a plurality of maximum vehicle speed limitation values and a plurality of acceleration/deceleration limitation values that are previously set according to load states; and
  adjusting a speed of the engine based on the determined limitation contents, thereby controlling driving of the forklift, wherein, when the determined limitation contents are changed, drive control related to the maximum vehicle speed is executed according to the limitation contents that are set after the change, an acceleration/deceleration limitation value is selected from the acceleration/deceleration limitation values according to the pattern of the change of the limitation contents, and drive control related to the acceleration/deceleration is executed to limit the acceleration/deceleration of the forklift by using the selected acceleration/deceleration limitation value.

* * * * *